United States Patent [19]

Kaneko et al.

[11] Patent Number: 4,588,517

[45] Date of Patent: May 13, 1986

[54] LIQUID CRYSTAL COMPOSITION

[75] Inventors: Masaharu Kaneko, Yamato; Tomio Yoneyama, Kawasaki; Junko Iwanami, Yamato; Shuji Imazeki, Hitachi; Akio Mukoh, Mito; Mikio Sato, Hitachi, all of Japan

[73] Assignees: Hitachi, Ltd.; Mitsubishi Chemical Industries, Ltd., both of Tokyo, Japan

[21] Appl. No.: 509,051

[22] Filed: Jun. 29, 1983

[30] Foreign Application Priority Data

Jun. 30, 1982 [JP] Japan .............................. 57-111690
Jun. 30, 1982 [JP] Japan .............................. 57-111689

[51] Int. Cl.⁴ ........................... C09K 3/34; G02F 1/13
[52] U.S. Cl. .................................. 252/299.1; 350/349; 534/577
[58] Field of Search ..................... 252/299.1; 350/349; 534/577

[56] References Cited

U.S. PATENT DOCUMENTS

| 4,122,027 | 10/1978 | Cole, Jr. et al. | 252/299.1 |
| 4,128,496 | 12/1978 | Cole, Jr. et al. | 252/299.1 |
| 4,128,497 | 12/1978 | Cole, Jr. et al. | 252/299.1 |
| 4,137,193 | 1/1979 | Osman et al. | 252/299.1 |

(List continued on next page.)

FOREIGN PATENT DOCUMENTS

| 2104 | 5/1979 | European Pat. Off. | 252/299.1 |
| 26004 | 4/1981 | European Pat. Off. | 252/299.1 |
| 47027 | 3/1982 | European Pat. Off. | 252/299.1 |
| 67354 | 12/1982 | European Pat. Off. | 252/299.1 |
| 76633 | 4/1983 | European Pat. Off. | 252/299.1 |
| 87248 | 8/1983 | European Pat. Off. | 252/299.1 |
| 2920730 | 11/1979 | Fed. Rep. of Germany | 252/299.1 |
| 3038372 | 5/1981 | Fed. Rep. of Germany | 252/299.1 |
| 53-26783 | 3/1978 | Japan | 252/299.1 |
| 56-57850 | 5/1981 | Japan | 252/299.1 |
| 58-21451 | 2/1983 | Japan | 252/299.1 |
| 58-111884 | 7/1983 | Japan | 252/299.1 |
| 58-164674 | 9/1983 | Japan | 252/299.1 |

OTHER PUBLICATIONS

Seki, H., et al., Jpn. J. Appl. Phys., vol. 21, No. 1, (Jan. 1982).
Cox, R. J., Mol. Cryst. Liq. Cryst., vol. 55, pp. 1-32, (1979).
Cognard, J., et al., Mol. Cryst. Liq. Cryst., vol. 68, pp. 207-229, (1981).
Jones, F., et al., Mol. Cryst. Liq. Cryst., vol. 60, pp. 99-110, (1980).

Primary Examiner—Teddy S. Gron
Attorney, Agent, or Firm—Antonelli, Terry & Wands

[57] ABSTRACT

The description is concerned with a liquid crystal composition of the guest-host type which contains a pleochroic dye dissolved therein. The dye molecule has an end group or end groups in the molecule represented by the general formula:

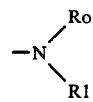

where Ro designates a straight chain of alkyl group, in which methylene group not adjacent to the nitrogen atom may be substituted by oxygen atom or sulfer atom; R1 designates an alkyl group having a chain length different from that of the alkyl group of Ro or a group

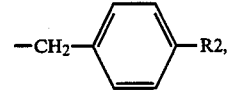

in R1 a methylene group not adjacent to the nitrogen atom may be substituted by oxygen atom or sulfur atom, and R2 designates hydrogen atom, alkyl group, alkoxy group, cycloalkyl group or dialkylamino group.

10 Claims, 9 Drawing Figures

U.S. PATENT DOCUMENTS

| | | | |
|---|---|---|---|
| 4,145,114 | 3/1979 | Coates et al. | 252/299.1 |
| 4,184,750 | 1/1980 | Bloom et al. | 252/299.1 |
| 4,288,147 | 9/1981 | Koch | 252/299.1 |
| 4,324,455 | 4/1982 | Imahori et al. | 252/299.1 |
| 4,348,298 | 9/1982 | Zascke et al. | 252/299.1 |
| 4,350,603 | 9/1982 | Aftergut et al. | 252/299.1 |
| 4,359,398 | 11/1982 | Cole, Jr. et al. | 252/299.1 |
| 4,363,743 | 12/1982 | Moeller et al. | 252/299.1 |
| 4,378,302 | 3/1983 | Aftergut et al. | 252/299.1 |
| 4,394,070 | 7/1983 | Brown et al. | 252/299.1 |
| 4,395,350 | 7/1983 | Peller et al. | 252/299.1 |
| 4,401,369 | 8/1983 | Jones | 252/299.1 |
| 4,411,812 | 10/1983 | Aftergut et al. | 252/299.1 |
| 4,426,312 | 1/1984 | Claussen | 252/299.1 |
| 4,477,368 | 10/1984 | Yamanashi et al. | 252/299.1 |
| 4,505,549 | 3/1985 | Shimidzu et al. | 252/299.1 |
| 4,519,935 | 5/1985 | Claussen | 252/299.1 |

LIQUID CRYSTAL COMPOSITION

BACKGROUND OF THE INVENTION

The present invention relates to a liquid crystal composition of the guest-host type for use in a liquid crystal display element which is able to color display.

Liquid crystal compositions of the guest-host type contain pleochroic dyes as a guest which are dissolved in host liquid crystal compositions. The pleochroic dyes are required to have a high order parameter (hereinafter referred to as S) in the host liquid crystals.

The order parameter is defined by the equation (I); the parameter can be obtained by equation (II) experimentally. In the equations, item of $\cos^2 \theta$ is a statistic average, $\theta$ is an angle between an absorption axis of a dye molecule and an orientation direction of a host liquid crystal, and A// and A⊥ denote absorbances by the dye molecules to the polarized lights, one being directed to in parallel to the orrientation direction of the liquid crystal molecules and the other being directed to parpendicularly to the orientation direction of the liquid crystal molecules, respectively.

$$S = (3 \overline{\cos^2 \theta} - 1)/2 \quad (I)$$

$$S = (A// - A\perp)/2(A\perp + A//) \quad (II)$$

S represents a parallelism of the absorption axis of the dye molecule with respect to the orientation direction of the liquid crystal, which governs a display contrast of a display device of the guest-host type. In case of pleochroic dyes having parallel dichroism, as the value of S approaches 1, the degree of color retention of relatively colorless portion becomes small so that a bright display with a high contrast can be possible. The relationship between the molecular structures of the pleochroic dyes and their various properties has not been studied sufficiently. Thus, it is very difficult to select pleochroic dyes having higher S values and a desired hue from a number of known dyes. It is also a difficult job to presuppose the nature of appropriate dyes among the known dyes.

As mentioned above, the S value is the most important parameter for characterizing the pleochroic dyes. In addition to that parameter, a large solubility of the dyes to the host liquid crystal is an important characteristic from the practical point of view. Into the molecules of dyes are often introduced as a so-called auxochromous group the following dialkylamino group,

(R's are alkyl groups such as methyl or ethyl group).

When R's in the dialkylamino groups are lower alkyl groups such as methyl group or ethyl group, such pleochroic dyes do not always have a sufficient solubility to the liquid crystal composition. In this case, the solubility can be increased by extending the length of the alkyl group in the dialkyl group to the length longer than butyl group.

This fact has been known in the field of guest-host liquid crystals. However, pleochroic dyes having such the long chains have small S values compared with those having methyl or ethyl groups, though their hues do not change.

SUMMARY OF THE INVENTION

An object of the present invention is to remove the above-mentioned problem of liquid crystal compositions containing pleochroic dyes having dialkylamino groups in the molecule. More particularly, it is an object of the present invention to provide liquid crystal compositions containing pleochroic dyes which have a longer solubility to liquid crystals than the conventional pleochroic dyes.

The present inventors have found that an introduction of a specific group into the molecule of the pleochroic dyes could remarkably improve the solubility to the host liquid crystal, without lowering the S value and hue of the dyes. The specific groups are represented by the following general formula:

$$-N\begin{matrix} R_0 \\ R_1 \end{matrix} \quad (III)$$

wherein R0 denotes alkyl group whose methylene group not adjacent to the nitrogen atom may be substituted with sulfur or oxygen atom; R1 is an alkyl group having a different chain length than that of R0 or has a group represented by

in $R_1$ a methylene group not adjacent to the nitrogen atom may be substituted by oxygen or sulfur atom; R2 being hydrogen atom, alkyl group, alkoxy group, cycloalkyl group or dialkyla-mino group.

When R0 is methyl group, R1 is preferably

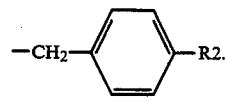

It has been confirmed by the present inventor that the phenomenon of increasing the solubility of the dyes to the liquid crystal by introducing the specific group into the molecule of pleochroic dyes has been observed in a great number of kinds of known pleochroic dyes.

The phenomenon has not been elucidated, but it is speculated that the tendency of crystallization of the molecules of the dye is lessened by introducing the specific group.

Examples of R2 in the formula (III) cover hydrogen atom, methyl group, ethyl group, straight or branched alkyl groups such as propyl, butyl, heptyl, octyl, dodecyl, octadecyl groups, cycloalkyl groups such as cyclohexyl, propylcyclohexyl and heptyl cyclohexyl groups, alkoxy groups such as methoxy, propoxy, octoxy, octadecyloxy groups, dialkylamino groups such as dimethylamino and diethylamino group. Pleochroic dyes to which the present invention can be applied include azo-series, axomethine-series, anthraquinone-series, quinophthalone-series, perylene-series, perynone-series, thioindigo-series, naphthalimido-series, oxazine-series, coumarin-series, naphthoquinone-series and merocyanine-series.

The general formulas of the above series are shown in Table 1. In Table 1, abbreviations are used to mean the following.

W: The group represented by formula (III).

B0, B1, B2, B3: —N=N—, —N=CH—, —CH=N—, —COO—, —OCO—, —COS—, —SCO—, —OCH$_2$—, —CH$_2$O—, —SCH$_2$—, —CH$_2$S—, —NHCO—, —CONH—, —CH$_2$CH$_2$—.

B4: —COO—, —OCO—, —COS—, —SCO—, —CH$_2$O—, —OCH$_2$—, —O—, —NH—, —S—, —CH$_2$—, —CH$_2$S—, —SCH$_2$—, —NHCO—, —CONH—, —CH$_2$CH$_2$—, or the groups shown in Table 2.

Y1: Hydrogen atom, alkyl group, cycloalkyl group, alkoxy group, nitro group, carboxylic acid ester group, alkoxy group, alkylsulfonyl group, aryl group, heteroring, halogen atom, the groups shown by W, or

Y2, Y3, Y4, Y5: Hydrogen atom, amino group, alkylamino group, arylamino group, hydroxyl group, one of them being amino or hydroxyl group.

Y6: Hydrogen atom, halogen atom, alkoxy group,

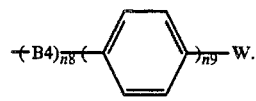

Y9, Y11: Hydrogen atom, amino group, hydroxyl group.

Y10: Hydrogen atom, amino group, hydroxy group,

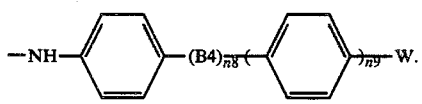

X1: Hydroxyl group, halogen atom, cyano group

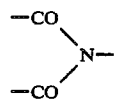

formed by it with B4.

X3, X4: Hydroxyl group, halogen atom, alkoxy group.

X5: Oxygen atom or sulfur atom.
X6: Hydrogen atom, hydroxyl group.
X7: Hydrogen atom, halogen atom.
X8: Hydrogen atom, alkyl group, alkoxy group,

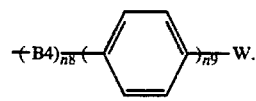

X9, X10: Hydrogen atom,

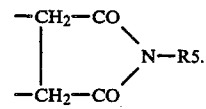

X11, X12:

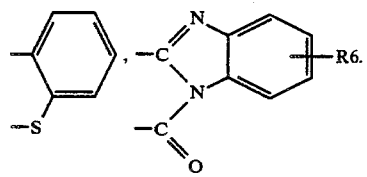

X13: Hydrogen atom, alkyl group, alkoxy group,

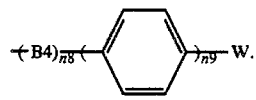

X14, X15: Hydrogen atom, halogen atom.
X16: Hydrogen atom, alkoxy group, acyloxy group,

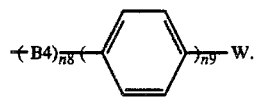

R3, R4: Hydrogen atom, alkyl group, nitrogen-containing ring such as pyrrolidine ring or morphfoline ring formed by them.

R5: Alkyl group,

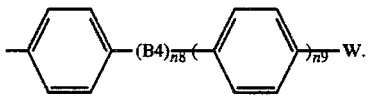

R6: Hydrogen atom, halogen atom, alkoxy group,

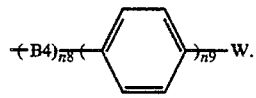

$Z^1$ to $Z^{18}$: Hydrogen atom, halogen atom, methyl group, hydroxyl group, methoxy group, cyano group, nitrogen-containing ring formed by them with R3 and R4 or aromatic ring formed by them.

$n_0$, $n_3$, $n_5$, $n_7$, $n_8$, $n_9$: zero or 1.
$n_1$, $n_2$, $n_4$, $n_6$: zero, 1 or 2.

m: 1, 2 or 3.

A nematic liquid crystal used in the present invention is selected from a considerably wide range, so far as it can show a nematic phase in the working temperature range of the display device. The nematic liquid crystal can be admixed with an optically active compound to obtain a cholesteric phase.

Examples of the nematic liquid crystals include compounds shown in Table 3 or their derivatives.

In Table 3, R7 represents alkyl or alkoxy, and X17 represents nitro, cyano, or halogen atom. All of the liquid crystals shown in Table 3 have a positive dielectric anisotropy, and the well known liquid crystals having a negative dielectric anisotropy, such as ester series, azoxy series, azo series, Schiff series, pyrimidine series, diester series or biphenyl series can be used by mixing with a liquid crystal having a positive dielectric anisotropy to produce a liquid crystal composition having a positive dielectric anisotropy on the whole. Even a liquid crystal having a negative dielectric anisotropy can be, of course, used directly by using a suitable device constitution and a driving method.

The host liquid crystal compounds for use in the present invention are any liquid crystal compounds shown in Table 3 or mixtures thereof. It has been found particularly useful for the present invention to use a liquid crystal compositions that are commercially available from Merk Co., West Germany, under the tradename of ZLI-1132, consisting of the following 4 kinds of liquid crystal compounds:

38.4% by weight of No. 2: ($R3=C_3H_7$, $X17=CN$)
34.2% by weight of No. 2: ($R7=C_5H_{11}$, $X17=CN$)
18.1% by weight of No. 2: ($R7=C_7H_{15}$, $X17=CN$)
9.3% by weight of No. 3: ($R7=C_5H_{11}$, $X17=CN$)

There is another example of liquid crystal composition commercially available from British Drug House under the tradename of E-7 consisting of the following 4 kinds of liquid crystal compounds:

51% by weight of No. 3: ($R7=C_5H_{11}$, $X17=CN$)
25% by weight of No. 3: ($R7=C_7H_{13}$, $X17=CN$)
16% by weight of No. 3: ($R7=C_8H_{17}O$, $X17=CN$)
8% by weight of No. 4: ($R7=C_5H_{11}$, $X17=CN$)

The optically active substance for use in the present liquid crystal compositions include chiral nematic liquid crystal compounds, for example, nematic liquid crystal compounds having optically active groups, such as 2-methylbutyl, 3-methylbutoxy, 3-methylpentyl, 3-methylpentoxy, 4-methylhexyl, 4-methylhexyloxy, etc.

Furthermore, other optically active substances such as alcohol derivatives, for example, 1-menthol, d-borneol, ketone derivatives such as d-camphor, 3-methylcyclohexane, carboxylic acid derivatives such as d-citronellic acid, 1-camphoric acid, aldehyde derivatives such as d-citronellal, alkene derivatives such as d-linonene, amines, nitriles and their derivatives, etc, which are disclosed in Japanese laid-open print No. 45546 of 1976.

The present invention is applicable to any conventional liquid crystal display device wherein desired patterns of electrodes are formed on opposing faces of a pair of electro-insulative substrates, at least one of which is transparent, a layer of a liquid crystal composition being interposed between the substrates.

The gap and parallelism between the substrates is kept by inserting a spacer therebetween as well known in the art.

DETAILED DESCRIPTION OF THE PREFERRED EMBODIMENTS

Figure 1:
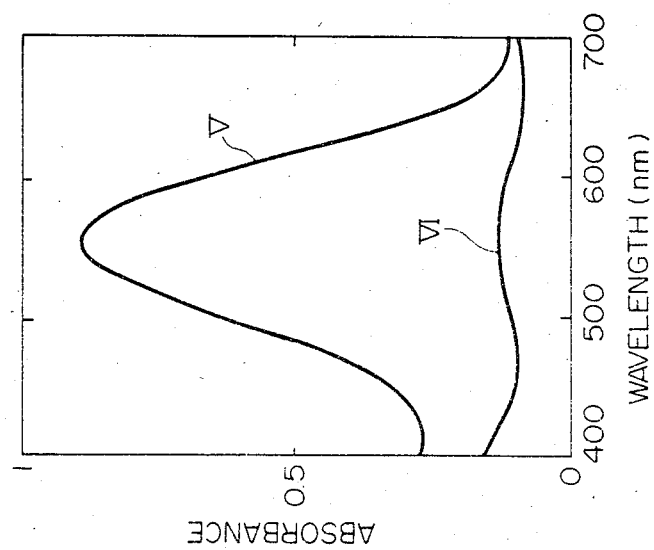
FIGS. 1 to 9 are spectral diagrams of liquid crystal display devices which employ the liquid crystal compositions of the present invention.

Examples of the dyes used in the present invention are shown in Table 4 wherein the hues, the order parameters (S) and the maximum absorption wavelengths (in parentheses) of the dyes are set forth. In Tables 4 and 5, dye Nos. C1 to C20 are controls.

The solubilities of the dyes used in the present invention to a liquid crystal composition are shown in Table 5, in comparison with the dyes that have been used in the conventional liquid crystal compositions for color display device. The solubility is designated by % by weight of the dye based on the weight of the composition.

In the experiments, the host liquid crystal composition was LLI-1132. The dyes were mixed with the composition at room temperature to dissolve it. The solubilities were determined at 25 degrees C.

The order parameters were measured by the following manner. The compositions containing the dyes were each charged between a pair of transparent glass plates.

The glass plate each have on the opposite faces transparent electrodes and orientation controlling films on the electrodes and the exposed surfaces. The gap between the glass plates was about 10 micrometers. The orientation controlling films were of cured polyimide. When the elements assembled are not applied an electric potential, molecules of the liquid crystal compounds and dyes are aligned along one direction and in parallel with the surfaces of the electrodes to be a homogeous alignment.

The compositions containing the dyes were each charged between a pair of transparent glass plates. The glass plates each have on the opposite faces transparent electrodes and controlling films on the electrodes and the exposed surfaces of the glass plates.

The gap between the glass plates was about 10 micrometers. The orientation controlling films were of cured polyimide. When an electric potential is not applied to the elements, an electric potential, molecules of the liquid crystal compounds and dyes are aligned along one direction and in parallel with the surfaces of the electrodes to form a homogeneous alignment.

Mesurement of absorption spectra (A// and A⊥) of the guest-host liquid crystal display devices was conducted wherein a liquid polarized in the direction parallel with the orientation of the molecules of the liquid crystals and a light polarized in the direction parpendicular to the orientation were used to determine absorbances (A//, A⊥) and the maximal wavelength of absorbed light.

In determining the absorbances, light absorption due to host liquid crystal compositions and a reflection loss by the surfaces of the elements were taken into calculation for compensation.

From the thus obtained absorbances A// and A⊥, S's of the dyes were computed by way of equation (II).

It is apparent from Table 5 that the introduction of the group

to the dye molecules can remarkably improve their solubilities to the host liquid crystals.

From Table 4, it is apparent that No. 36 dye exhibits a larger S than its analogy C-20; similarly, No. 176 dye exhibits a larger S than its analogy C-2.

No. 36 dye has a solubility of at least 3.5% by weight, and No. 176 has a solubility of at least 5% by weight.

There are shown in Table 6 A//, A⊥ and S of other dyes. As host liquid crystal composition ZLI-1132 was used, and a measuring temperature was 25 degrees C. The gap was about 10 micrometers. The numerals in remarks of Table 6 correspond to the numerals of drawings attached hereto.

In FIGS. 1 to 9, A//'s are shown by lines 1, 3, 5, 7, 9, 11, 13, 15 and 17; A⊥'s are shown by lines 2, 4, 6, 8, 10, 12, 14, 16 and 18. Examples of production methods for the dyes having new chemical structure shown in Table 6 will be illustrated in the following. In Table 7, there are shown aromatic compounds which are starting materials for synthesis of the dyes.

SYNTHESIS EXAMPLE 1

3.88 grams of compound (A) in Table 7 was reacted with 30 ml of dioxane, 0.1 ml of dimethyl formamide and 2.4 grams of thionyl chloride at 80 degrees C. for 2 hours. Then the reactants were cooled down to 50 degrees C. Thereafter, 1.6 grams of p-n-butylphenol and 5 ml of triethylamine were added to the reactants. The mixture was reacted at 80 degrees C. for 2 hours. The reactants was cooled down to room temperature and dropped into 300 ml of water. The resulting precipitate was purified by a column-chromatography method to obtain No. 39 dye. The dye had a melting point of 158.5 to 160.5 degrees C.

SYNTHESIS EXAMPLE 2

1.28 grams of compound (B) were admixed with 3 ml of hydrochloric acid and 25 ml of water. Then the mixture was cooled down to a temperature of zero to 5 degrees C. To the mixture dropped was an aqueous solution of 0.72 gram of sodium nitrate. The solution was stirred at zero to 5 degrees C. for about 4 hours, then an exess of sodium nitrate was decomposed by adding sulphamic acid to the solution so as to obtain an aqueous solution of a tetrazonium salt.

On the other hand, 1.91 grams of compound (C) was dissolved to 50 ml of N.M.P., followed by cooling down to zero to 5 degrees C. To the resulting solution dropped was an quueous solution of above-mentioned tetrazonium salt solution under stirring; the mixture was agitated below 10 degrees C. for about 2 hours. The mixture was neutralized with sodium carbonate to effect precipitation.

The precipitate was purified by the method of Example 1 above to obtain No. 177 dye, which had a melting point of 131.5 to 132.6 degrees C.

SYNTHESIS EXAMPLE 3

1.52 grams of compound (D) were dissolved to 60 ml of acetic acid, then 1.1 ml of concentrated hydrochloric acid and 50 ml of water were added to the solution. The solution was cooled down to zero to 5 degrees C. To the resulting solution dropped was 0.36 gram of an aqueous solution of sodium nitrate.

The solution was agitated at zero to 5 degrees for about 2 to 3 hours; an excess of sodium nitrate was decomposed by adding sulphamic acid so as to produce an aqueous solution of diazonium salt.

On the other hand, 0.99 gram of compound (E) was added to 50 ml of N.M.P. To the resulting solution dropped was the diazonium salt solution under stirring. The mixture was agitated below 10 degrees C. for about one hour, the mixture was neutralized with sodium carbonate to effect precipitation.

The precipitate was purified in the same manner as in the previous examples to produce No. 228 dye, which had a melting point of 132.8 to 133.3 degrees C.

TABLE 1

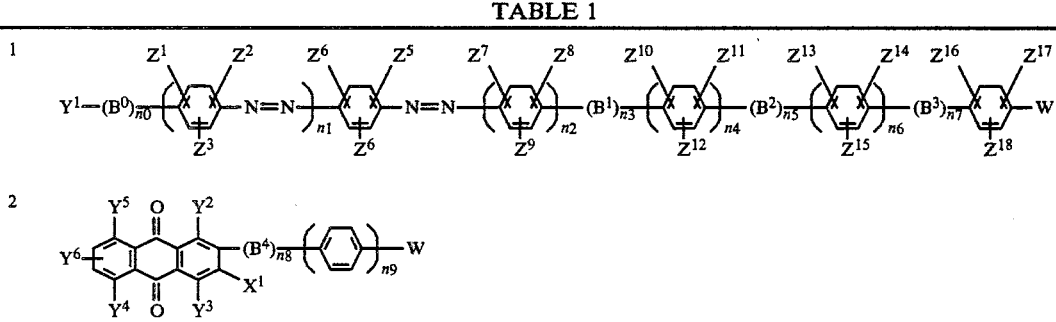

TABLE 1-continued
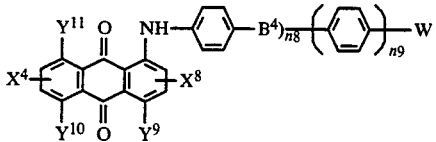
TABLE 2
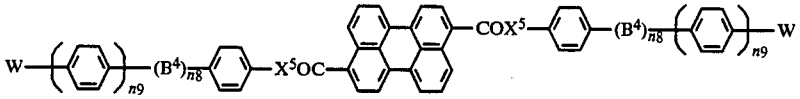

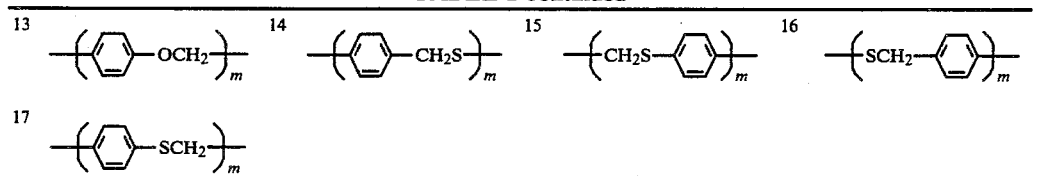
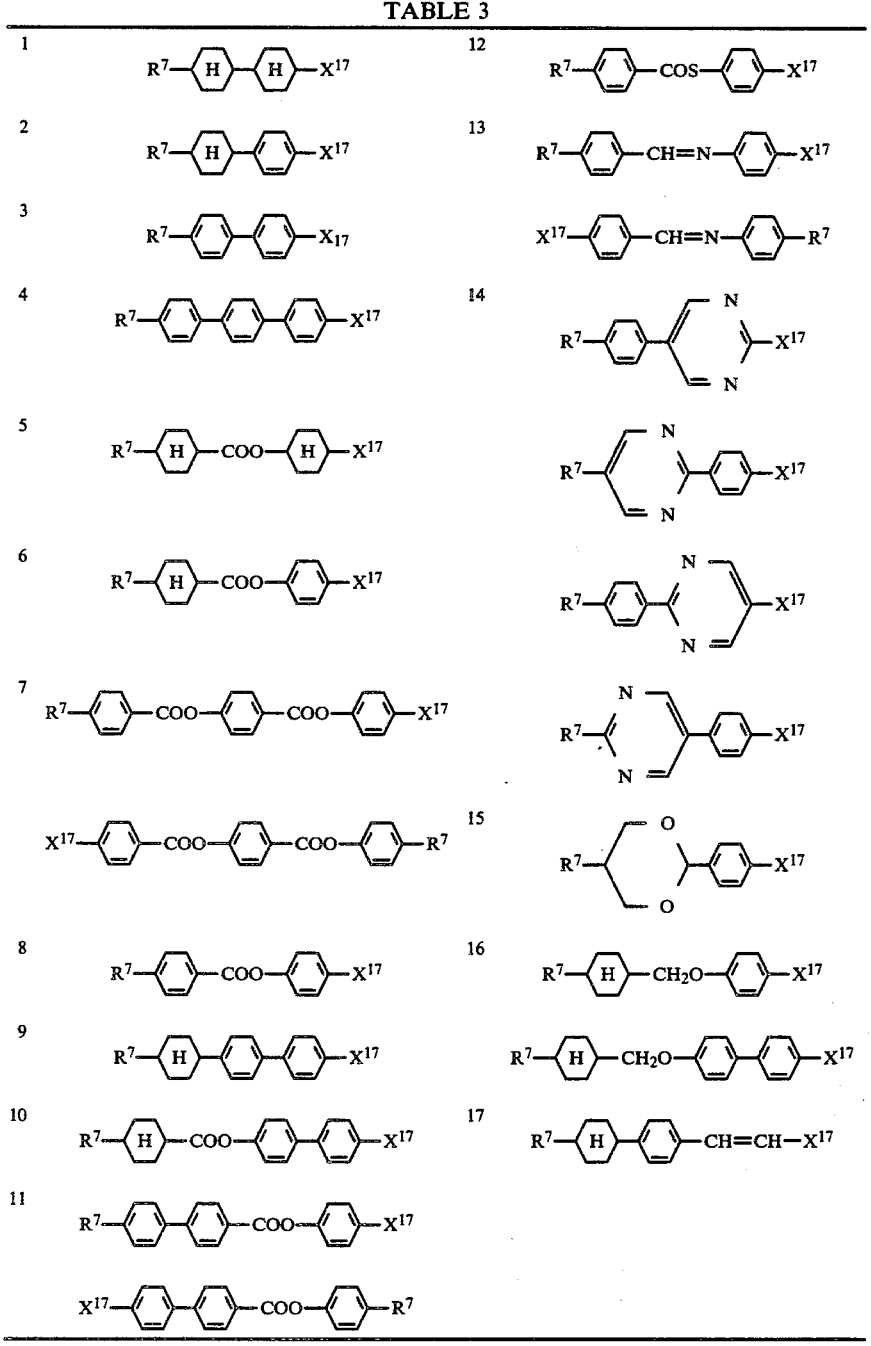
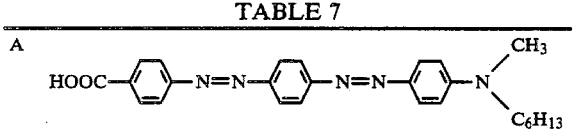

TABLE 7-continued
B 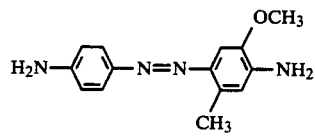
C 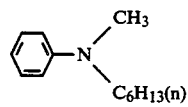
D 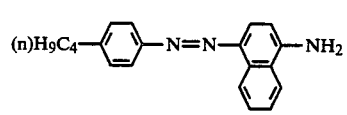
E 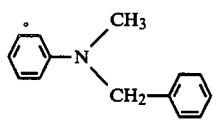
TABLE 4
| # | Structure | Value |
|---|-----------|-------|
| 1 | C₆H₅—N=N—C₆H₄—N(CH₃)(C₆H₁₃(n)) <br> yellow | 0.64 |
| 2 | O₂N—C₆H₄—N=N—C₆H₄—N(CH₃)(C₆H₁₃(n)) <br> bitter orange | 0.62 |
| 3 | (n)H₉C₄—C₆H₄—N=N—C₆H₄—N(C₂H₅)(C₄H₉(n)) <br> yellow | 0.65 |
| 4 | (H₃C)(H₅C₂)CH—C₆H₄—N=N—C₆H₄—N(CH₃)(C₅H₁₃(n)) <br> yellow | 0.66 |
| 5 | H₉C₄OOC—C₆H₄—N=N—C₆H₄—N(CH₃)(C₆H₁₃(n)) <br> yellow | 0.64 |
| 6 | (n)H₁₁C₅O—C₆H₄—C₆H₄—N=N—C₆H₄—N(CH₃)(C₆H₁₃(n)) <br> yellow | 0.72 |

TABLE 4-continued

| # | Structure | Value |
|---|---|---|
| 7 | NC–C₆H₄–OOC–C₆H₄–N=N–C₆H₄–N(CH₃)(C₅H₁₁(n)) <br> yellow | 0.70 |
| 8 | 5-methyl-benzoxazol-2-yl–C₆H₄–N=N–C₆H₄–N(CH₃)(C₆H₁₃(n)) <br> yellow | 0. |
| 9 | (n)H₉C₄–C₆H₄–OOC–C₆H₄–N=N–C₆H₄–N(CH₃)(C₆H₁₃(n)) <br> yellow | 0.70 |
| 10 | (n)H₉C₄–C₆H₄–H₂CH(CH₃)–C₆H₄–N=N–C₆H₄–N(CH₃)(C₁₀H₂₁(n)) <br> yellow | 0.62 |
| 11 | NC–C₆H₄–N=N–C₆H₄–N(C₂H₅)(C₅H₁₁(n)) <br> yellow | 0.63 |
| 12 | H₃COCHN–C₆H₄–N=N–C₆H₄–N(CH₃)(C₆H₁₃(n)) <br> yellow | 0.62 |
| 13 | (n)H₇C₃OOC–C₆H₄–N=N–C₆H₃(OH)–N(CH₃)(C₆H₁₃(n)) <br> bitter orange | 0.62 |
| 14 | (n)H₉C₄–C₆H₁₀(H)–C₆H₄–N=N–C₆H₄–N(CH₃)(C₆H₁₃(n)) <br> yellow | 0.70 |
| 15 | (n)H₉C₄–C₆H₄–OOC–C₆H₄–N=N–C₆H₄–N(C₃H₇(n))(C₆H₁₃(n)) <br> yellow | 0.68 |
| 16 | (n)H₉C₄OOC–C₆H₄–N=N–C₆H₄–N(C₂H₅)(C₅H₁₁(n)) <br> yellow | 0.58 |

TABLE 4-continued

| # | Structure | Value |
|---|-----------|-------|
| 17 | (n)H₉C₄—[H]—OCO—C₆H₄—N=N—C₆H₄—N(CH₃)(C₆H₁₃(n)) <br> yellow | 0.71 |
| 18 | (n)H₉C₄—[H]—CH₂O—C₆H₄—N=N—C₆H₄—N(C₂H₅)(C₁₆H₃₃(n)) <br> yellow | 0.69 |
| 19 | (n)H₂₅C₁₂—C₆H₄—CONH—C₆H₄—N=N—C₆H₄—N(C₄H₉(n))(C₆H₁₃(n)) <br> yellow | 0.68 |
| 20 | (n)H₃₇C₁₈—C₆H₄—CON(CH₃)—C₆H₄—N=N—C₆H₄—N(CH₃)(C₆H₁₃(n)) <br> yellow | 0. |
| 21 | (n)H₉C₄O—[H]—CH(O–CH₂)(O)—C₆H₄—N=N—C₆H₄—N(CH₃)(C₁₂H₂₅(n)) <br> yellow | 0.71 |
| 22 | (n)H₉C₄—[H]—[bicyclo]—C₆H₄—N=N—C₆H₄—N(CH₃)(C₆H₁₃(n)) <br> yellow | 0.72 |
| 23 | (n)H₉C₄O—C₆H₄—[pyrimidine]—C₆H₄—N=N—C₆H₄—N(CH₃)(C₆H₁₃(n)) <br> yellow | 0.77 |
| 24 | C₆H₅—CH₂CH₂—C₆H₄—N=N—C₆H₄—N(CH₃)(C₆H₁₃(n)) <br> yellow | 0.63 |
| 25 | O₂N—C₆H₄—N=N—C₆H₄—N=N—C₆H₄—N(CH₃)(C₆H₁₃(n)) <br> red | 0.71 |
| 26 | C₆H₅—N=N—C₆H₄—N=N—C₆H₄—N(CH₃)(C₆H₁₃(n)) <br> bitter orange (493 nm) | 0.71 |

TABLE 4-continued

| | Structure | Value |
|---|---|---|
| 27 | (n)H₉C₄—C₆H₄—N=N—C₆H₄—N=N—C₆H₄—N(CH₃)(C₆H₁₃(n))<br>bitter orange | 0.75 |
| 28 | C₆H₅—C₆H₄—N=N—C₆H₄—N=N—C₆H₄—N(CH₃)(C₆H₁₃(n))<br>bitter orange | 0.76 |
| 29 | NC—C₆H₄—N=N—C₆H₄—N=N—C₆H₄—N(CH₃)(C₆H₁₃(n))<br>red | 0.74 |
| 30 | C₆H₅—N=N—C₆H₄—N=N—C₆H₄—N(C₂H₅)(C₁₀H₂₁(n))<br>bitter orange | 0.71 |
| 31 | H₃C—C₆H₄—N=N—C₆H₄—N=N—C₆H₄—N(CH₃)(C₄H₉(n))<br>bitter orange | 0.71 |
| 32 | Cl—C₆H₄—N=N—C₆H₄—N=N—C₆H₄—N(CH₃)(C₆H₁₃(n))<br>bitter orange | 0.6 |
| 33 | H₅C₂O—C₆H₄—N=N—C₆H₄—N=N—C₆H₄—N(CH₃)(C₆H₁₃(n))<br>bitter orange | 0.76 |
| 34 | F—C₆H₄—N=N—C₆H₄—N=N—C₆H₄—N(CH₃)(C₆H₁₃(n))<br>bitter orange | 0.71 |
| 35 | O₂N—C₆H₄—N=N—C₆H₂(OCH₃)(OCH₃)—N=N—C₆H₄—N(CH₃)(C₆H₁₃(n))<br>red | 0.68 |

TABLE 4-continued

| No. | Structure | Value |
|---|---|---|
| 36 | (n)H₉C₄–[phenyl]–N=N–[naphthyl]–N=N–[phenyl]–N(CH₃)(C₆H₁₃(n))<br>reddish purple | 0.71 |
| 37 | (n)H₉C₄–[phenyl]–[phenyl]–N=N–[naphthyl]–N=N–[phenyl]–N(CH₃)(C₆H₁₃(n))<br>reddish purple | 0.77 |
| 38 | (n)H₁₇C₆O₂S–[phenyl]–N=N–[naphthyl]–N=N–[phenyl]–N(CH₃)(C₄H₉(n))<br>purple | 0.73 |
| 39 | (n)H₉C₄–[phenyl]–OOC–[phenyl]–N=N–[phenyl]–N=N–[phenyl]–N(CH₃)(C₆H₁₃(n))<br>red (515 nm) | 0.79 |
| 40 | NC–[phenyl]–OOC–[phenyl]–N=N–[phenyl]–N=N–[phenyl]–N(CH₃)(C₆H₁₃(n))<br>red | 0.78 |
| 41 | (n)H₉C₄–[cyclohexyl-H]–OOC–[phenyl]–N=N–[phenyl]–N=N–[phenyl]–N(CH₃)(C₆H₁₃(n))<br>red | 0.75 |
| 42 | (n)H₉C₄–[phenyl]–OOC–[phenyl]–N=N–[naphthyl]–N=N–[phenyl]–N(CH₃)(C₆H₁₃(n))<br>purple (556 nm) | 0.75 |
| 43 | NC–[phenyl]–OOC–[phenyl]–N=N–[naphthyl]–N=N–[phenyl]–N(CH₃)(C₆H₁₃(n))<br>purple | 0.76 |

TABLE 4-continued
| | | |
|---|---|---|
| 44 | 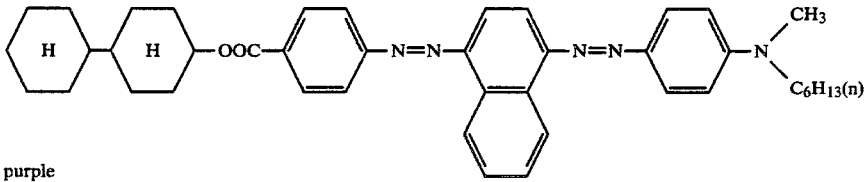 purple | 0.7 |
| 45 | 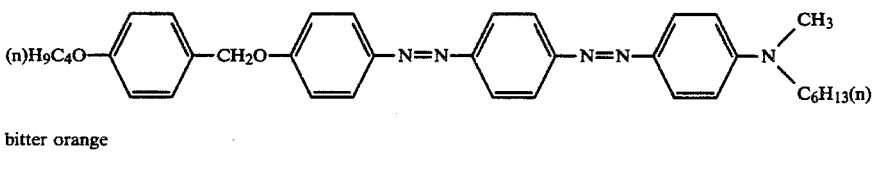 bitter orange | 0.75 |
| 46 | 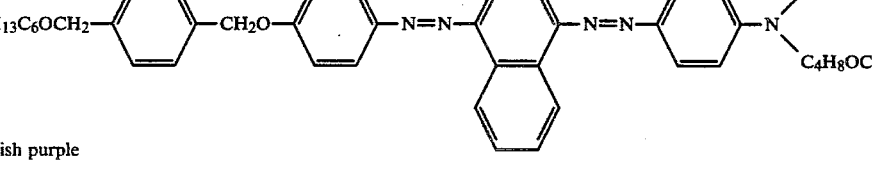 reddish purple | 0.73 |
| 47 | 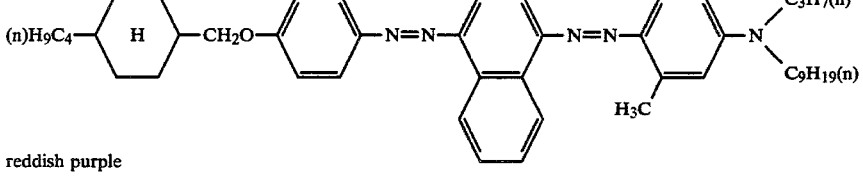 reddish purple | 0.72 |
| 48 | 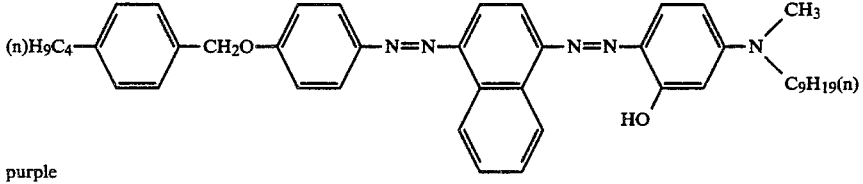 purple | 0.73 |
| 49 | 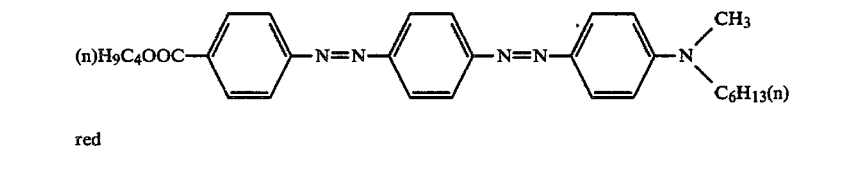 red | 0.75 |
| 50 | 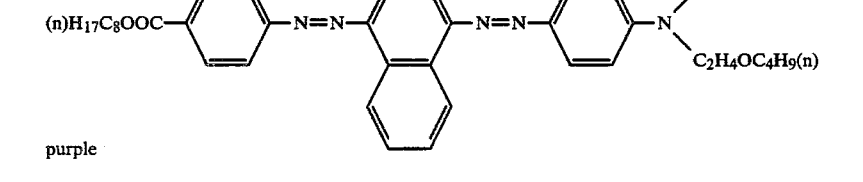 purple | 0.75 |
| 51 | 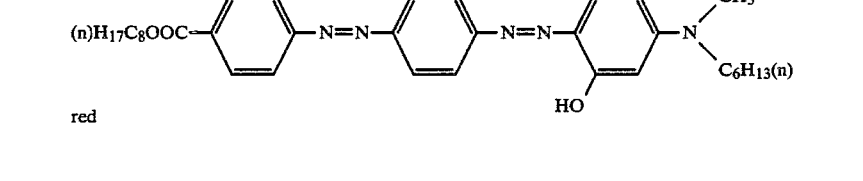 red | 0.70 |

TABLE 4-continued
| 52 | 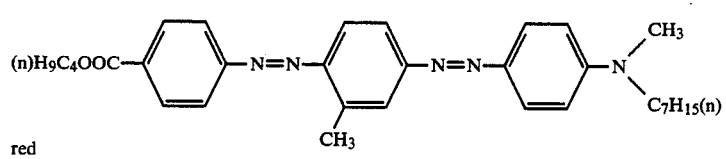 red | 0.70 |
| 53 | 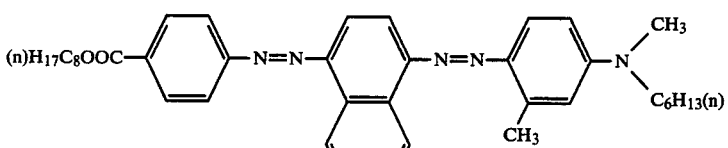 purple | 0.71 |
| 54 | 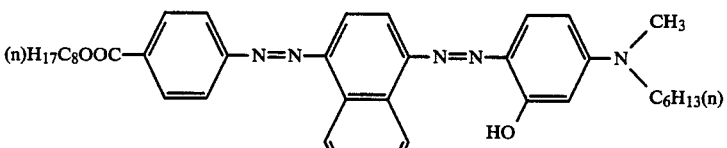 purple | 0.72 |
| 55 | 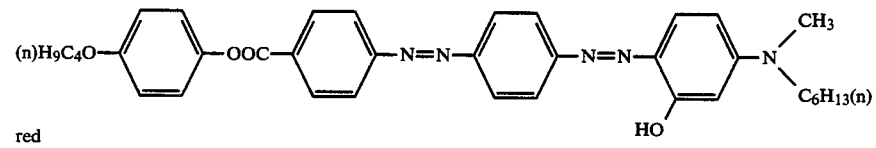 red | 0.72 |
| 56 | 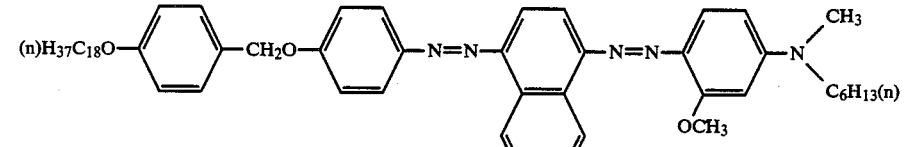 purple | 0. |
| 57 | 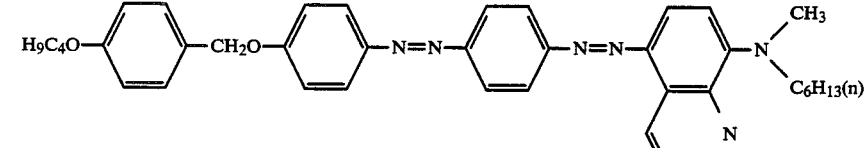 bluish red | 0.73 |
| 58 | 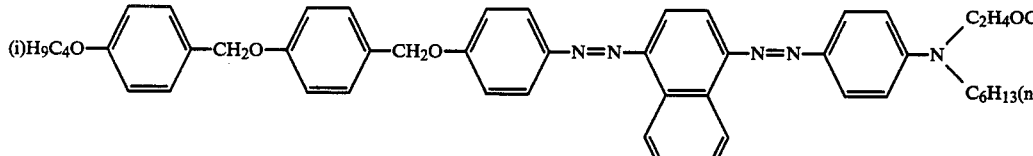 reddish purple | 0.74 |
| 59 | 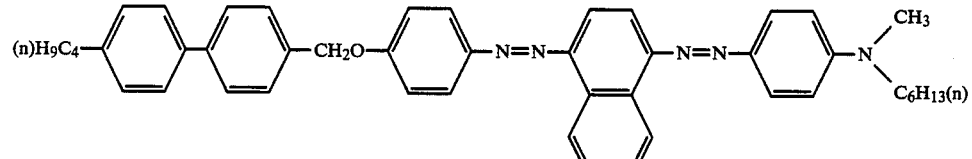 reddish purple | 0.75 |

TABLE 4-continued
| | | |
|---|---|---|
| 60 | 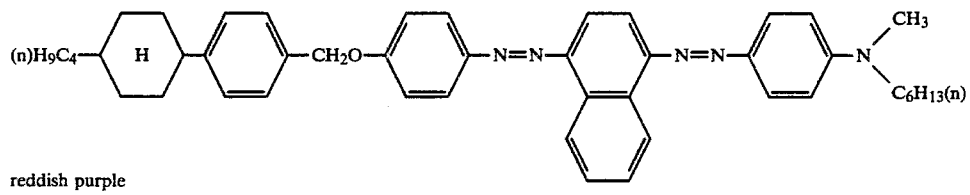 reddish purple | 0.76 |
| 61 | 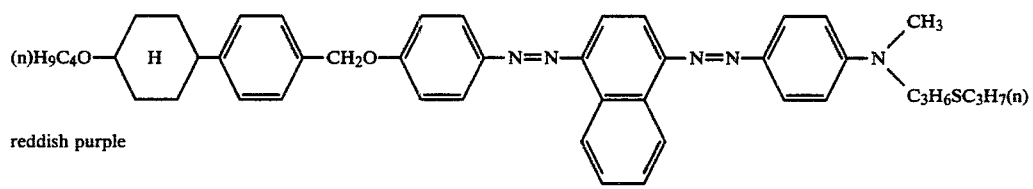 reddish purple | 0.75 |
| 62 | 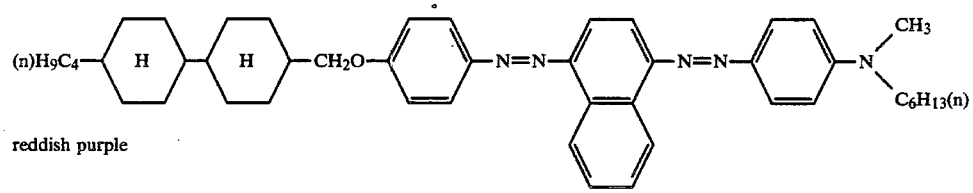 reddish purple | 0.75 |
| 63 | 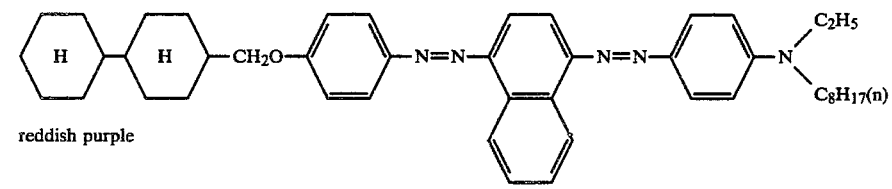 reddish purple | 0.73 |
| 64 | 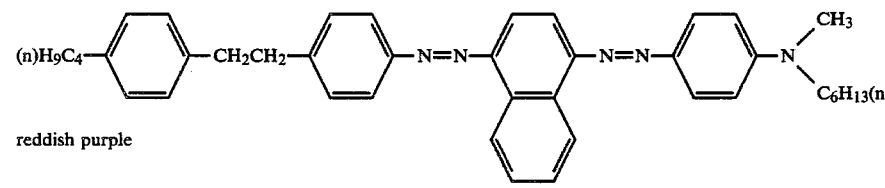 reddish purple | 0.75 |
| 65 | 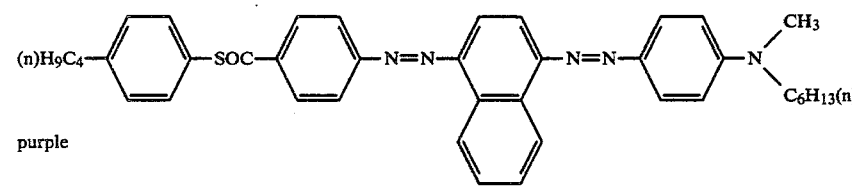 purple | 0.74 |
| 66 | 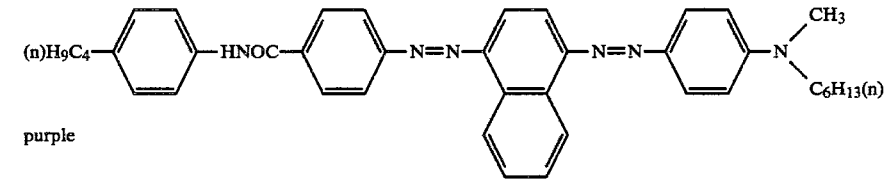 purple | 0.75 |
| 67 | 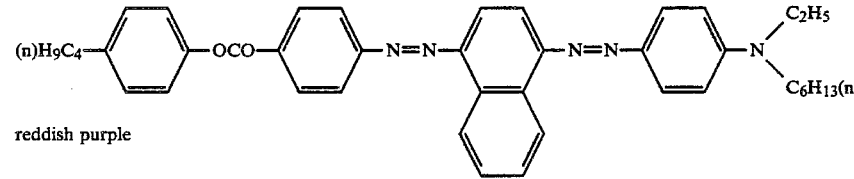 reddish purple | 0.76 |

-continued
| | | |
|---|---|---|
| 68 | 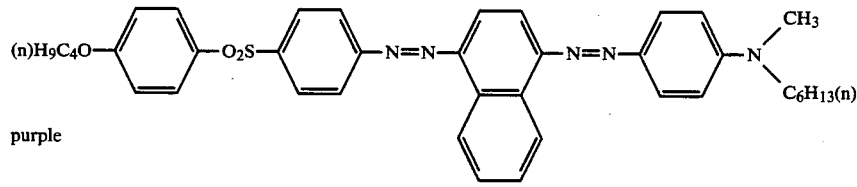 purple | 0.75 |
| 69 | 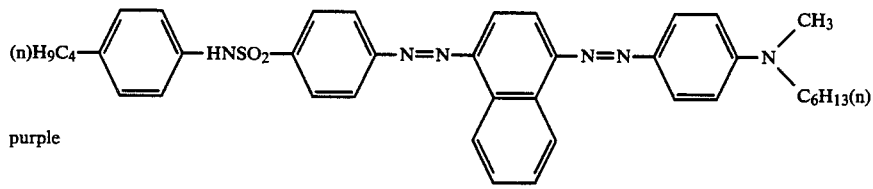 purple | 0.72 |
| 70 | 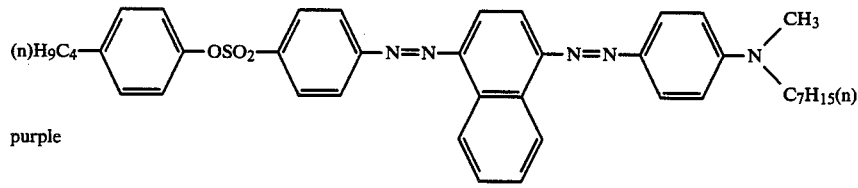 purple | 0.74 |
| 71 | 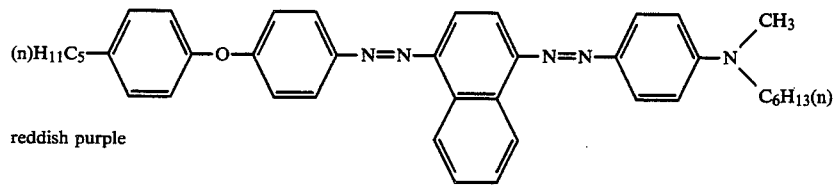 reddish purple | 0.70 |
| 72 | 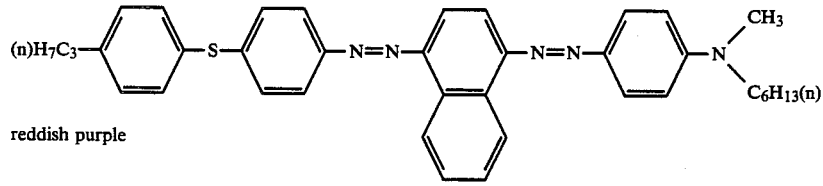 reddish purple | 0.67 |
| 73 | 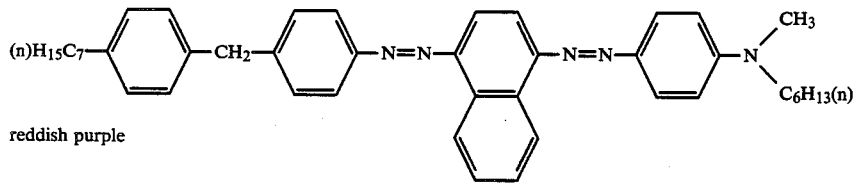 reddish purple | 0.68 |
| 74 | 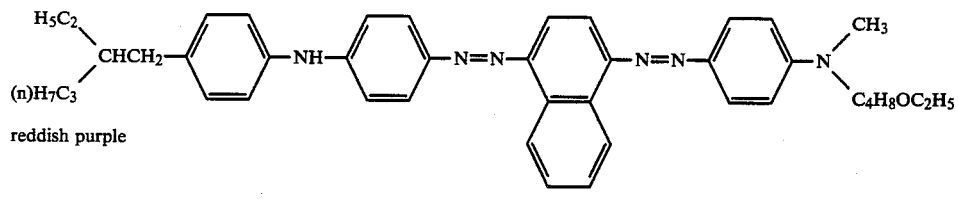 reddish purple | 0.69 |
| 75 | 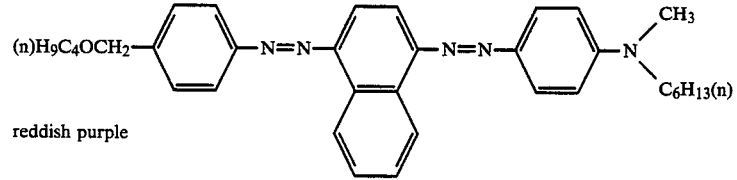 reddish purple | 0.74 |

| | | |
|---|---|---|
| 76 | 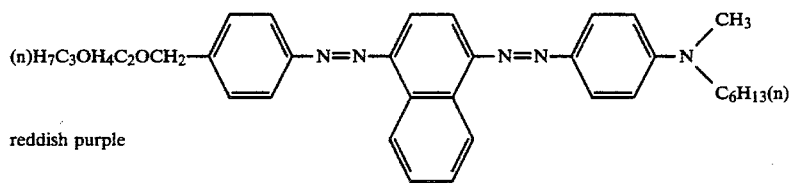 reddish purple | 0.73 |
| 77 | 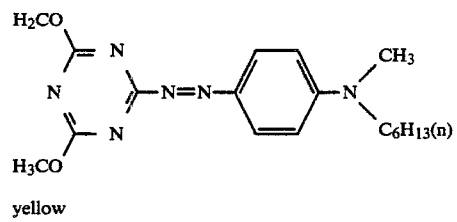 yellow | 0.57 |
| 78 | 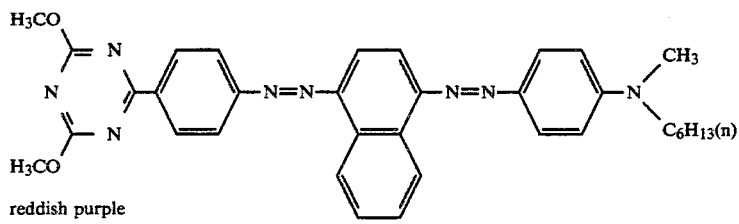 reddish purple | 0.76 |
| 79 | 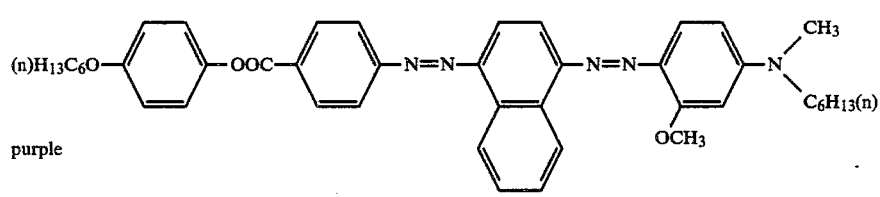 purple | 0.71 |
| 80 | 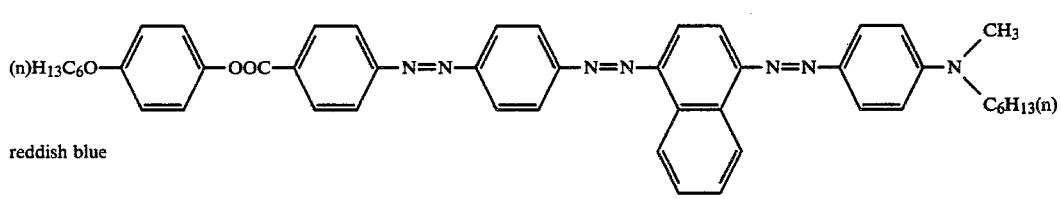 reddish blue | 0.75 |
| 81 | 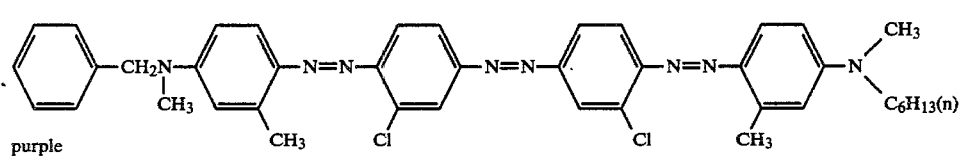 purple | 0.73 |
| 82 | 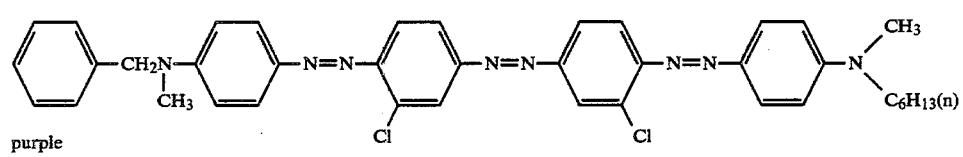 purple | 0.76 |
| 83 | 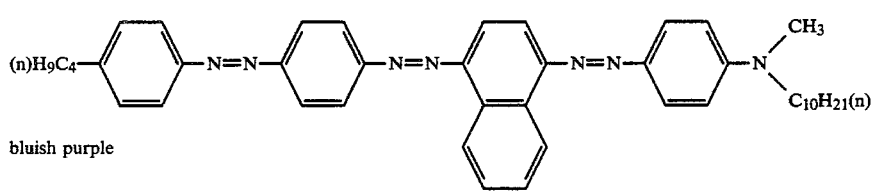 bluish purple | 0.77 |

-continued
84 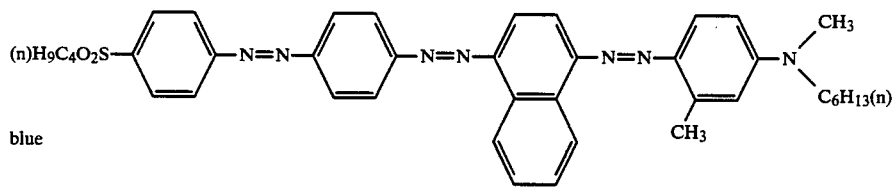
blue
0.73
85 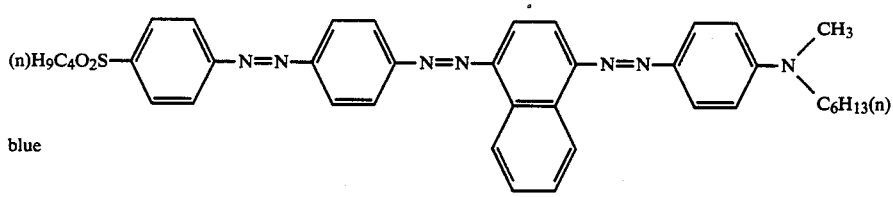
blue
0.75
86 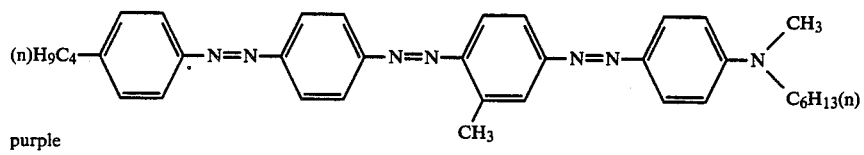
purple
0.78
87 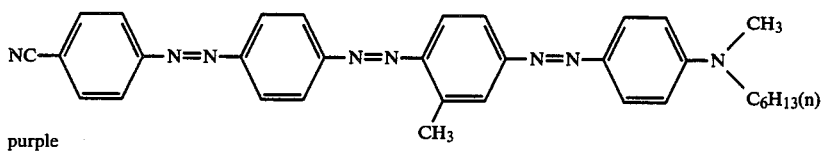
purple
0.76
88 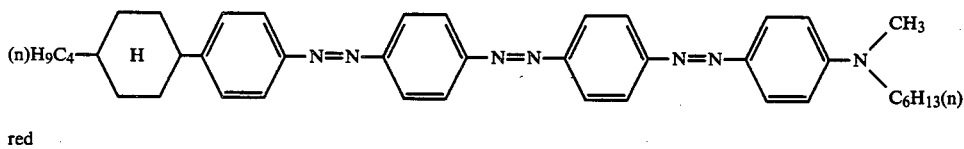
red
0.79
89 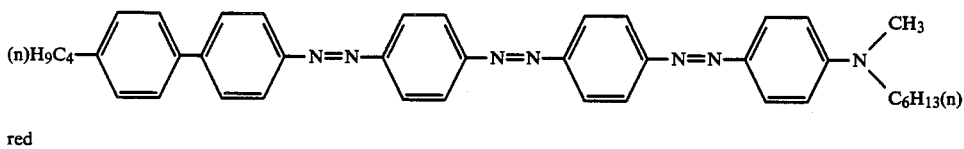
red
0.80
90 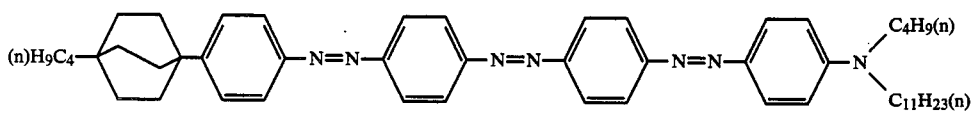
red
0.79
91 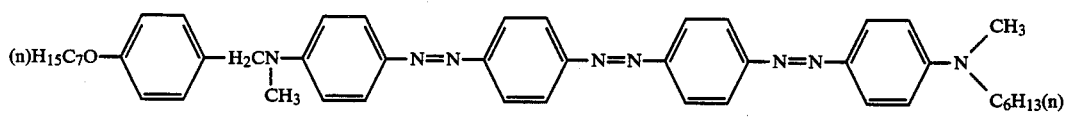
red
0.75
92 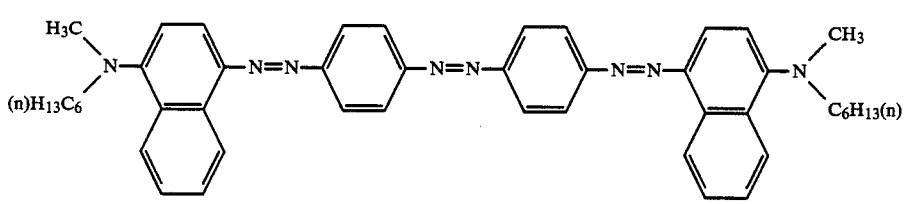
reddish blue
0.75

-continued

| # | Structure | Color | Value |
|---|---|---|---|
| 93 | (H₃C)(n-C₆H₁₃)N–C₆H₄–N=N–C₆H₃(Cl)–C₆H₃(Cl)–N=N–C₆H₄–N(CH₃)(C₆H₁₃(n)) | yellow | 0.74 |
| 94 | (H₃C)(H₃C)N–C₆H₄–N=N–C₆H₄–OCO–C₆H₄–N=N–C₆H₄–N(CH₃)(C₆H₁₃(n)) | yellow | 0.69 |
| 95 | (H₅C₂)₂N–C₆H₄–N=N–C₆H₄–OCH₂–C₆H₄–N=N–C₆H₄–N(CH₃)(C₆H₁₃(n)) | yellow | 0.69 |
| 96 | (H₃C)(n-C₆H₁₃)N–C₆H₄–N=N–C₆H₄–N=N–C₆H₄–N=N–C₆H₄–N(CH₃)(C₆H₁₃(n)) | red | 0.68 |
| 97 | (H₃C)(n-C₆H₁₃)N–C₆H₄–N=N–C₆H₄–NHCO–C₆H₄–N=N–C₆H₄–N(CH₃)(C₆H₁₃(n)) | yellow | 0.74 |
| 98 | (H₃C)(n-C₆H₁₃)N–C₆H₄–N=N–C₆H₄–C₆H₄–N=N–C₆H₄–N(C₂H₅)(C₆H₁₃(n)) | yellow | 0.78 |
| 99 | 1,4-dihydroxyanthraquinone-2-yl substituted with C₆H₄–N(CH₃)(C₆H₁₃(n)) | yellowish bitter orange | 0.72 |
| 100 | 1-hydroxy-4-amino-anthraquinone-2-yl substituted with C₆H₄–N(CH₃)(C₆H₁₃(n)) | reddish purple | 0.72 |
| 101 | 1-amino-4-hydroxy-anthraquinone-2-yl substituted with C₆H₄–N(CH₃)(C₅H₁₀OC₂H₅) | reddish purple | 0.72 |

| | | |
|---|---|---|
| 102 | 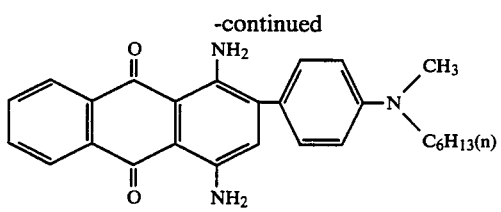<br>purple | 0.74 |
| 103 | 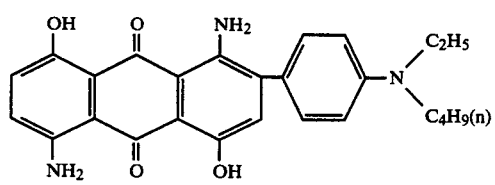<br>blue | 0.73 |
| 104 | 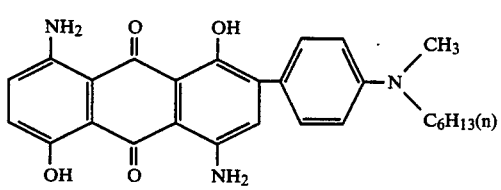<br>blue | 0.72 |
| 105 | 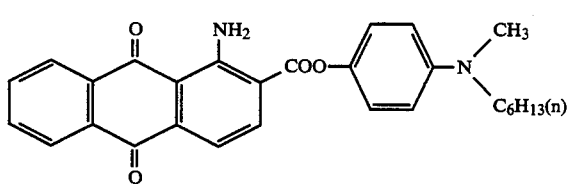<br>bitter orange | 0.76 |
| 106 | 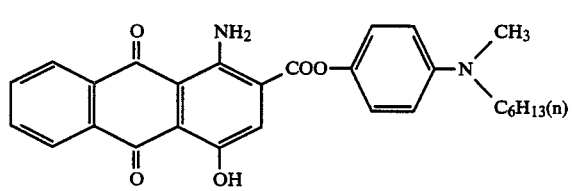<br>purple | 0.73 |
| 107 | 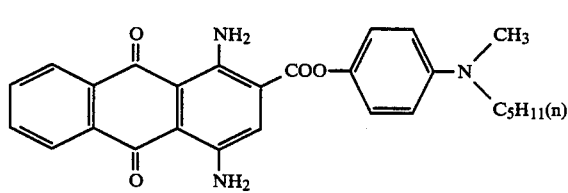<br>blue   (643 nm) | 0.75 |
| 108 | 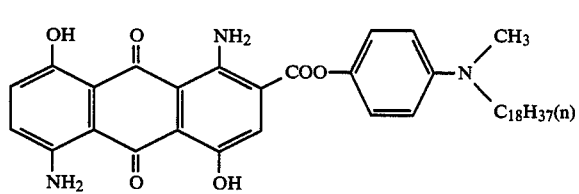<br>blue | 0.76 |

| | | |
|---|---|---|
| 109 | 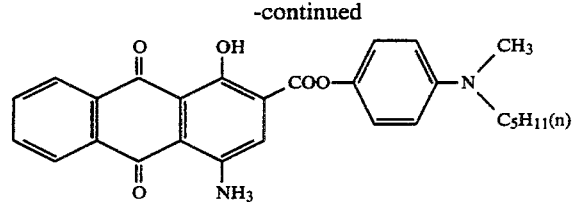<br>reddish purple | 0.74 |
| 110 | 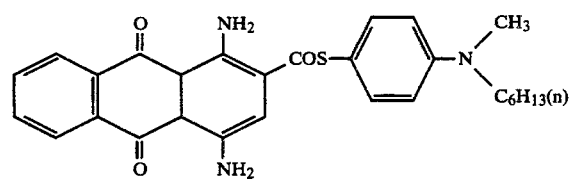<br>blue | 0.77 |
| 111 | 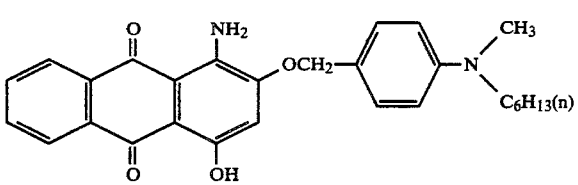<br>red | 0.70 |
| 112 | 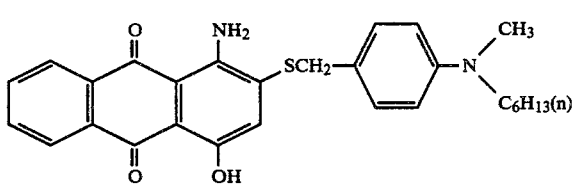<br>reddish purple | 0.73 |
| 113 | 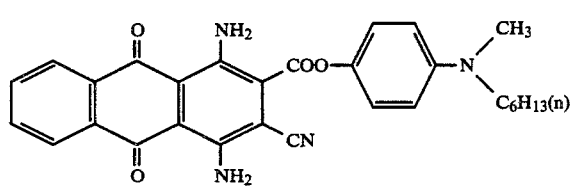<br>cyane     (666 nm) | 0.72 |
| 114 | 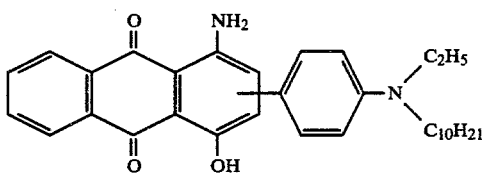<br>reddish purple | 0.74 |
| 115 | 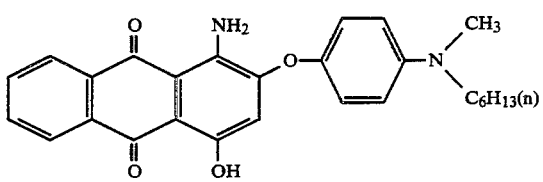<br>red | 0.68 |

| | | |
|---|---|---|
| 116 | 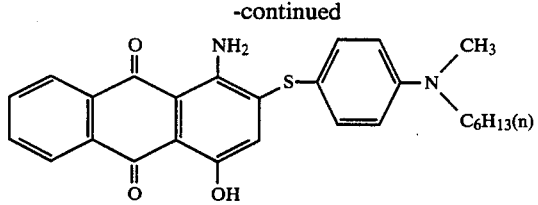<br>reddish purple | 0.59 |
| 117 | 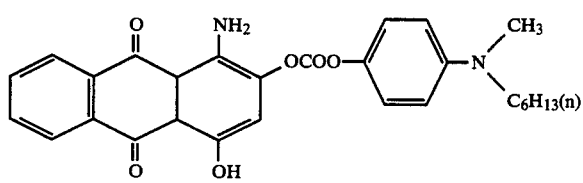<br>bluish purple | 0.60 |
| 118 | 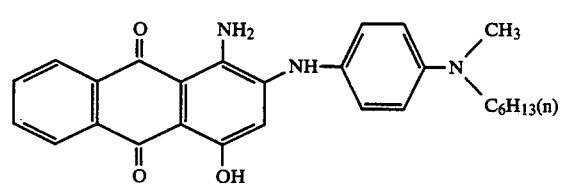<br>red | 0.60 |
| 119 | 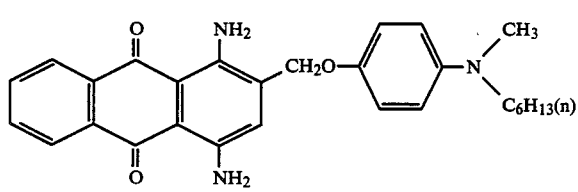<br>purple | 0.71 |
| 120 | 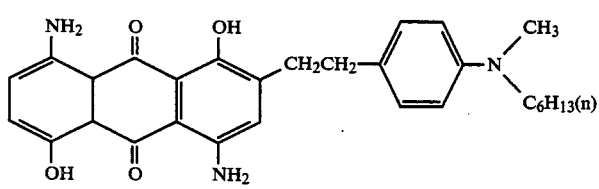<br>blue | 0.72 |
| 121 | 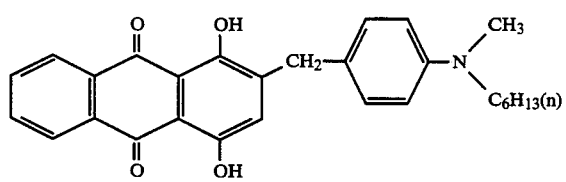<br>yellowish bitter orange | 0.66 |
| 122 | 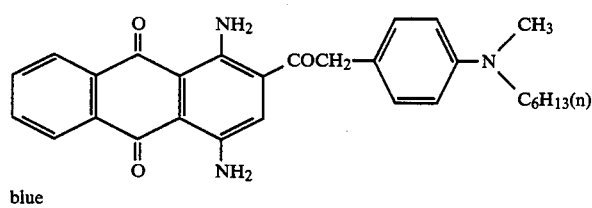<br>blue | 0.72 |

123 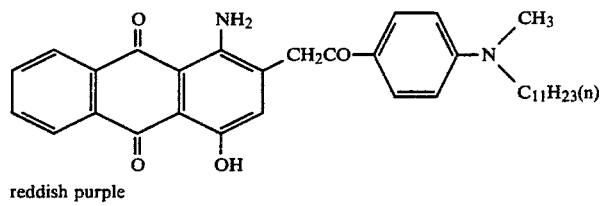 0.73
reddish purple
124 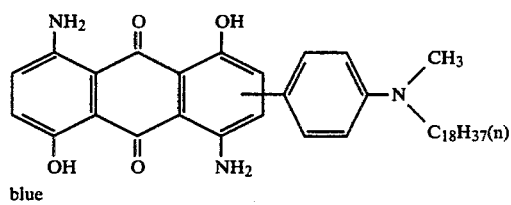 0.74
blue
125 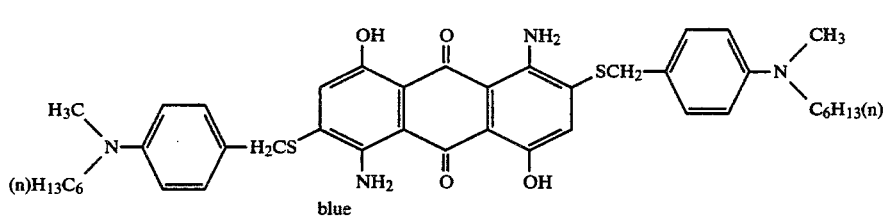 0.73
blue
126 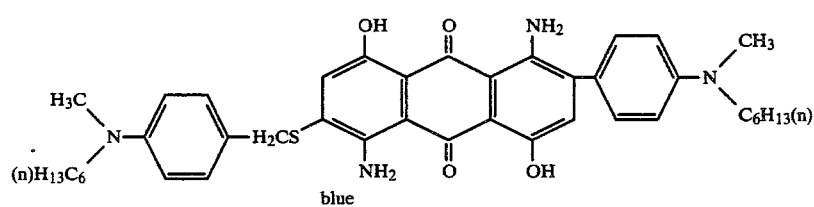 0.72
blue
127 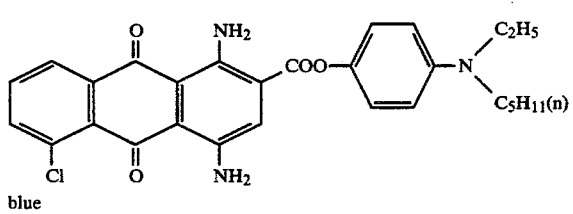 0.74
blue
128 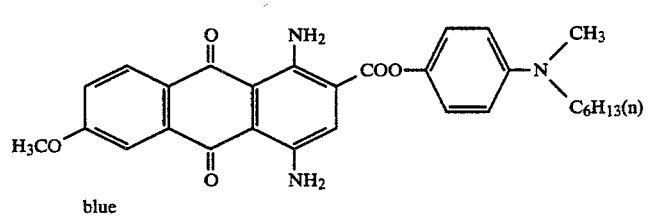 0.75
blue
129 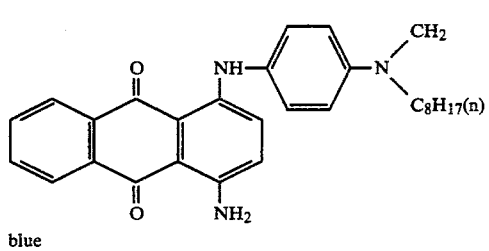 0.59
blue 130 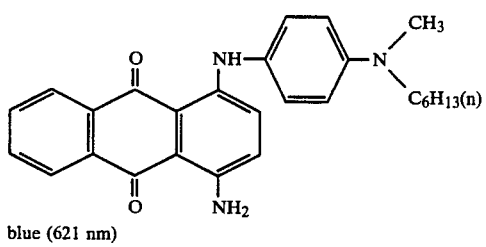 0.61
blue (621 nm)
131 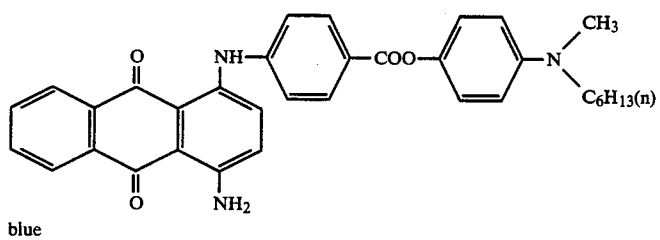 0.71
blue
132 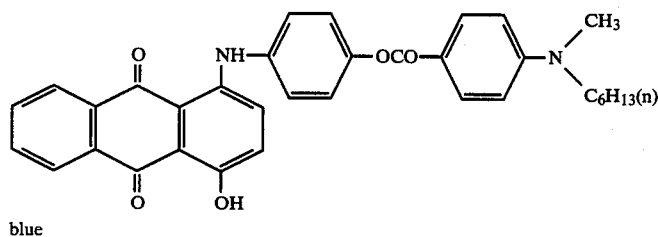 0.70
blue
133 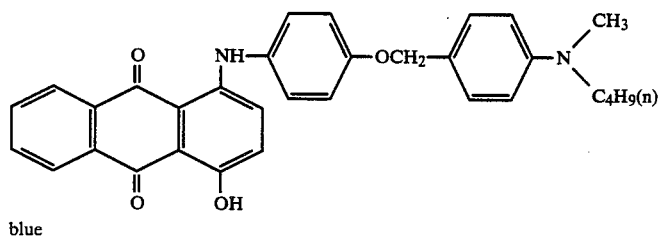 0.71
blue
134 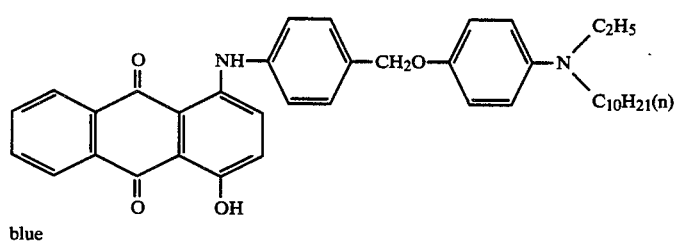 0.59
blue
135 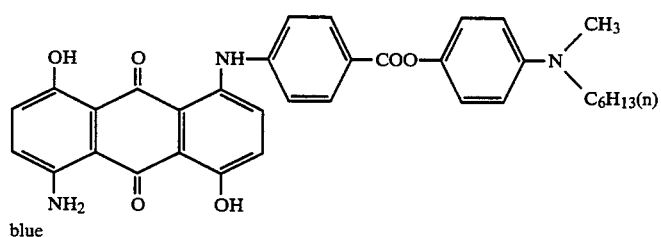 0.72
blue -continued
136 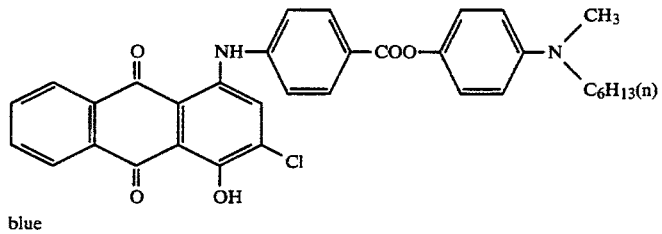 0.69
blue
137 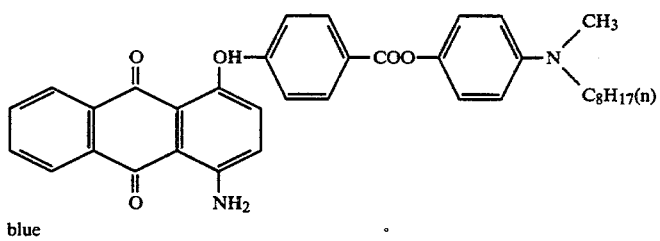 0.72
blue
138 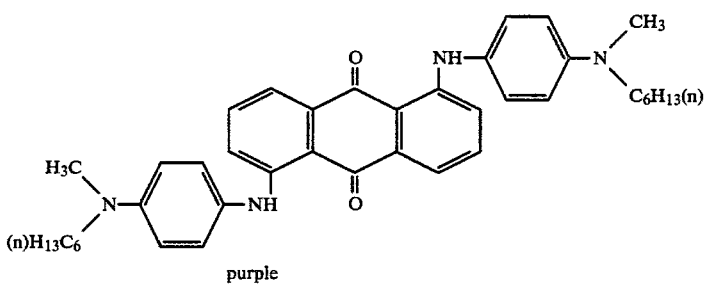 0.70
purple
139 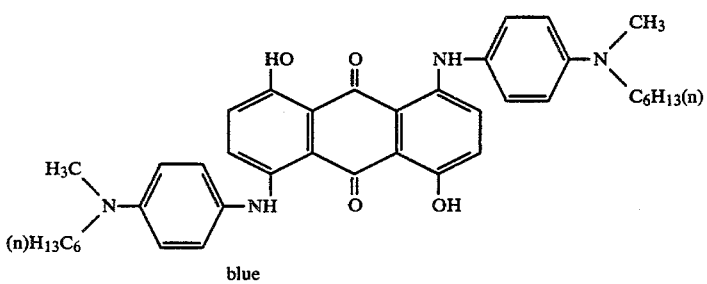 0.66
blue
140 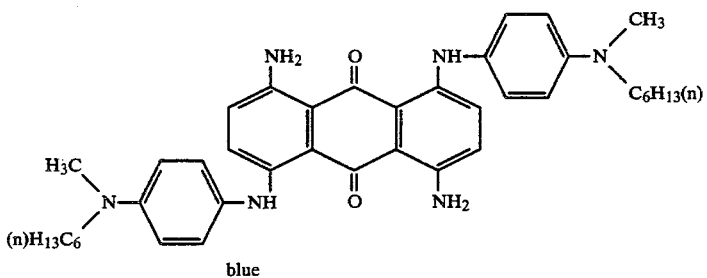 0.65
blue
141 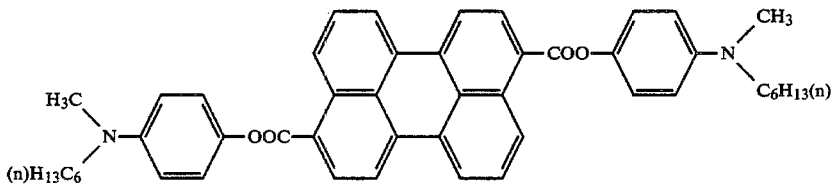 0.71
yellow -continued
| | | |
|---|---|---|
| 142 | 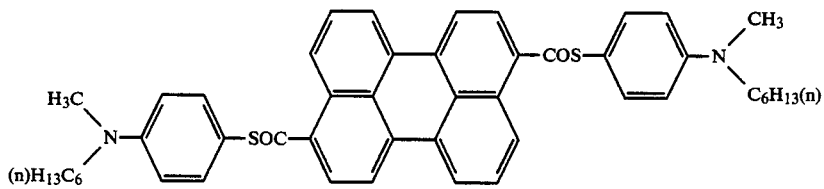 yellow | 0.71 |
| 143 | 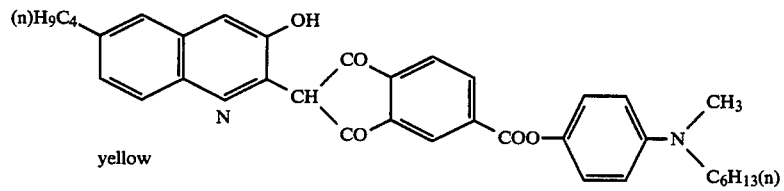 yellow | 0.68 |
| 144 | 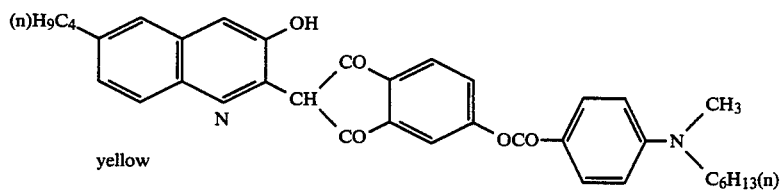 yellow | 0.70 |
| 145 | 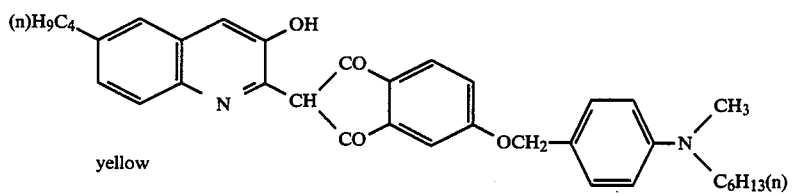 yellow | 0.68 |
| 146 | 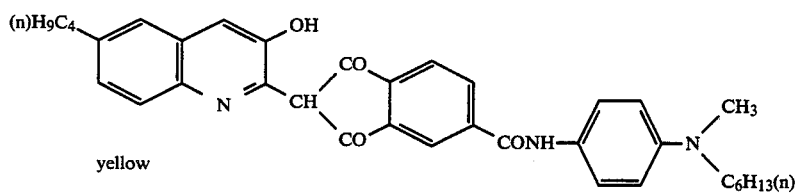 yellow | 0.67 |
| 147 | 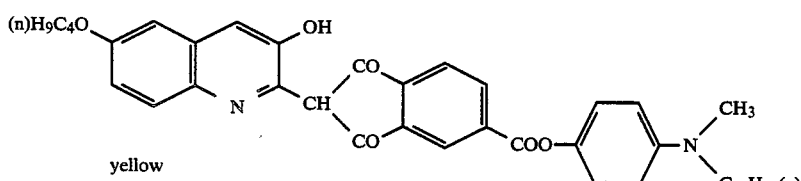 yellow | 0.70 |
| 148 | 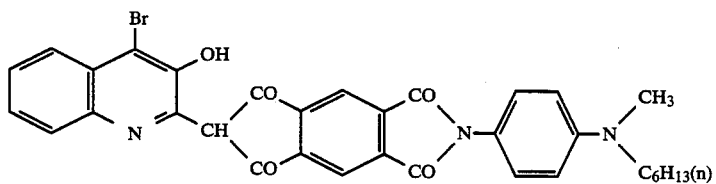 yellow | 0.72 |
| 149 | 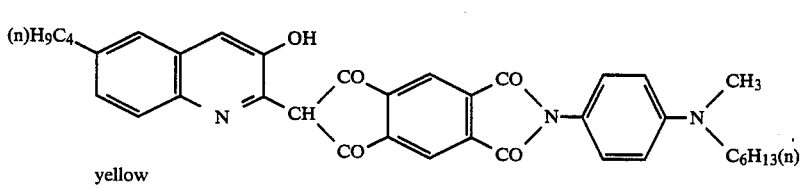 yellow | 0.74 |

| | | |
|---|---|---|
| 150 | 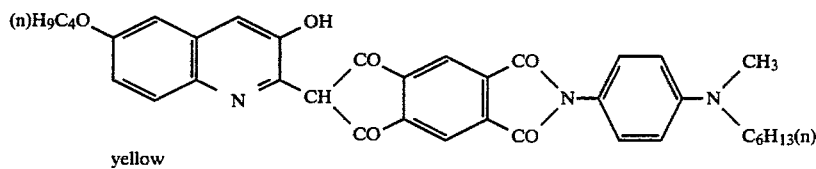 yellow | 0.74 |
| 151 | 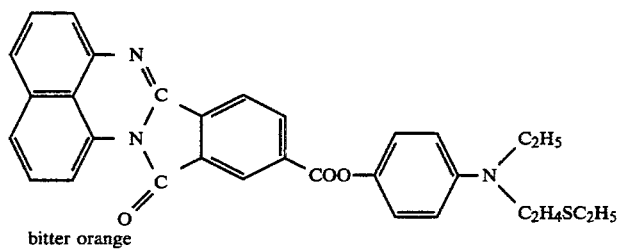 bitter orange | 0.69 |
| 152 | 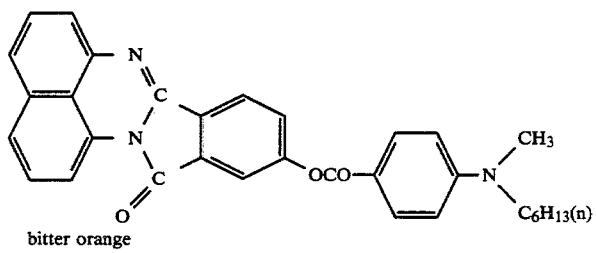 bitter orange | 0.69 |
| 153 | 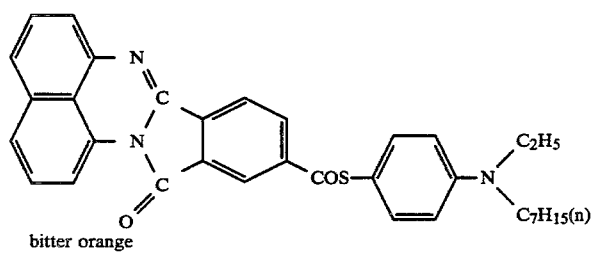 bitter orange | 0.70 |
| 154 | 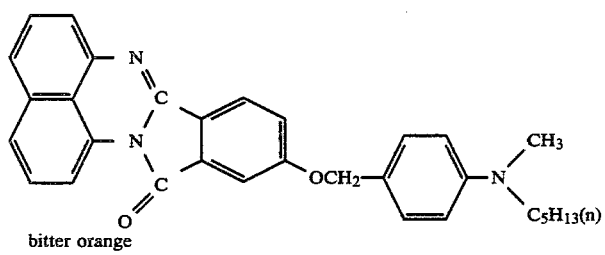 bitter orange | 0.68 |
| 155 | 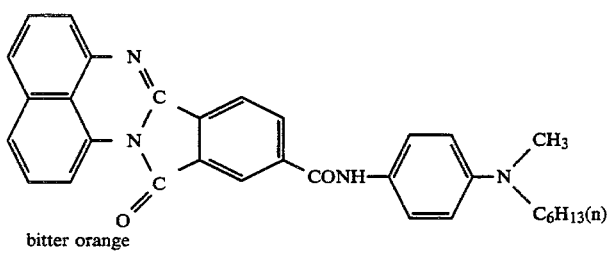 bitter orange | 0.66 |

156 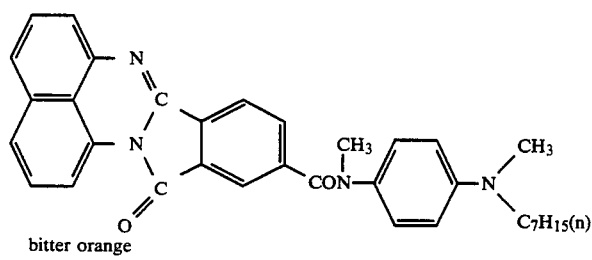 0.61
bitter orange
157 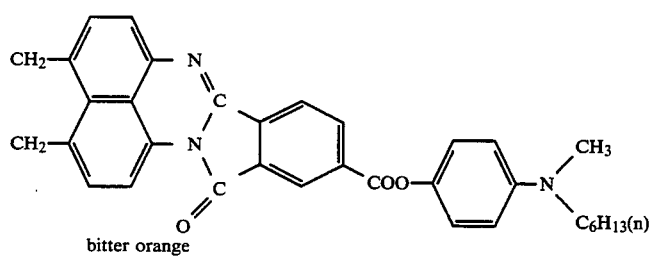 0.70
bitter orange
158 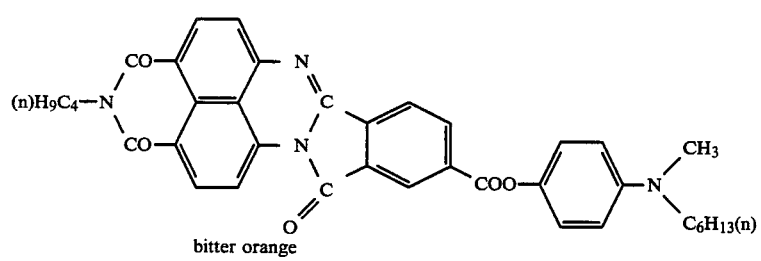 0.71
bitter orange
159 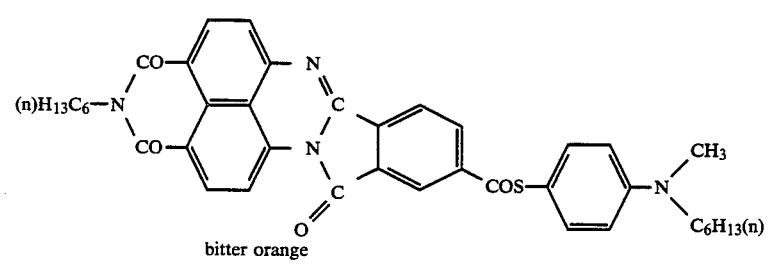 0.75
bitter orange
160 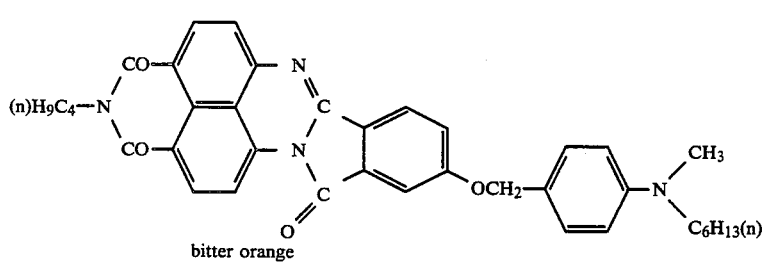 0.72
bitter orange
161 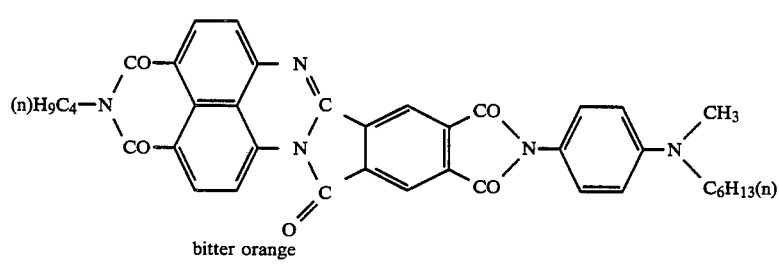 0.72
bitter orange

| | | |
|---|---|---|
| 162 | 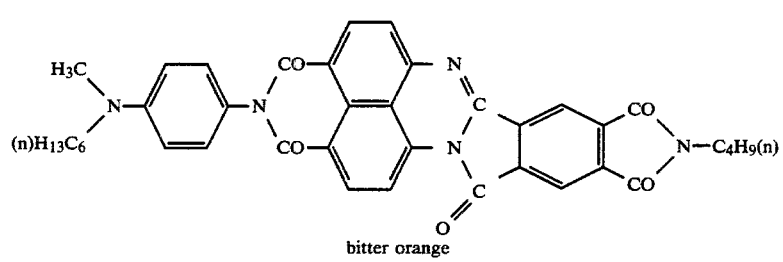   bitter orange | 0.73 |
| 163 | 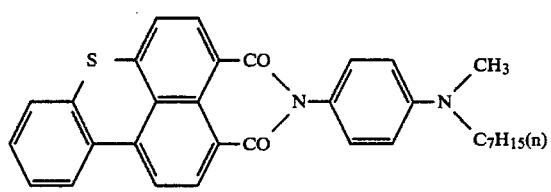   yellow | 0.70 |
| 164 | 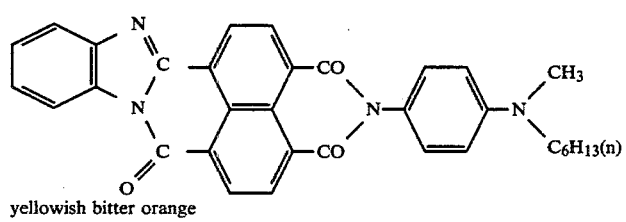   yellowish bitter orange | 0.69 |
| 165 | 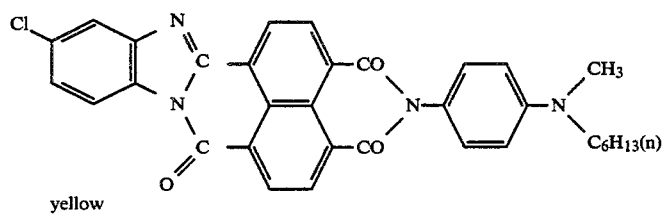   yellow | 0.70 |
| 166 | 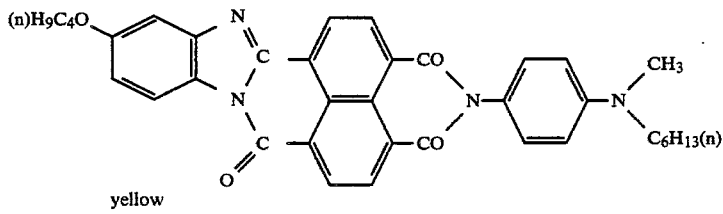   yellow | 0.70 |
| 167 | 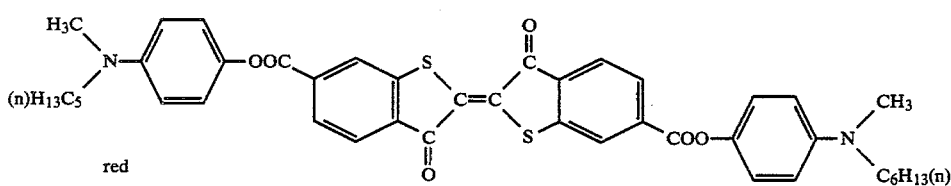   red | 0.71 |
| 168 | 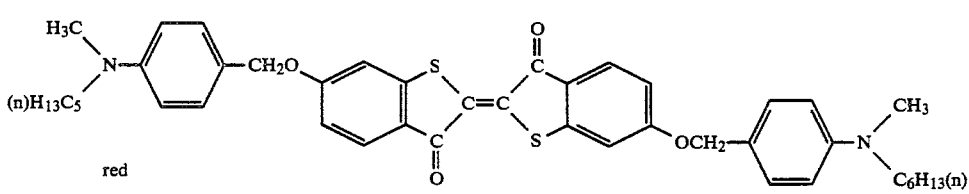   red | 0.72 |

| # | Structure | Value |
|---|---|---|
| 169 | reddish purple | 0.68 |
| 170 | reddish purple | 0.66 |
| 171 | purple (569 nm) | 0.76 |
| 172 | red (512 nm) | 0.70 |
| 173 | red (512 nm) | 0.74 |
| 174 | purple (550 nm) | 0.70 |
| 175 | purple | 0.78 |
| 176 | reddish bitter orange (496 nm) | 0.61 |
| 177 | purple (552 nm) | 0.73 |

-continued
| | | |
|---|---|---|
| 178 | 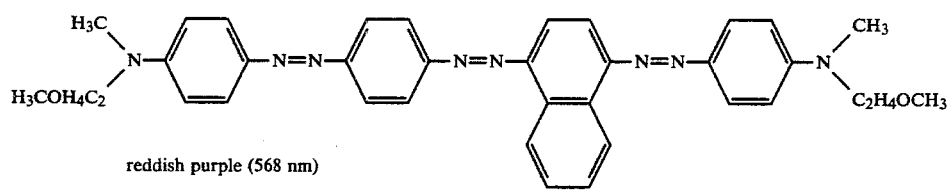<br>reddish purple (568 nm) | 0.75 |
| 179 | 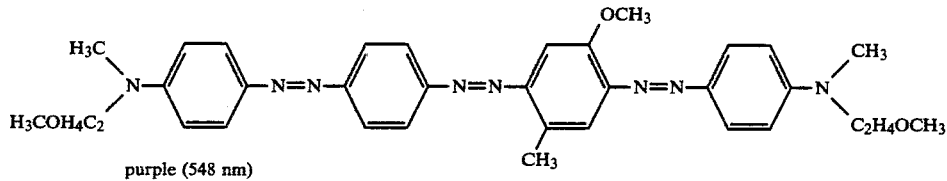<br>purple (548 nm) | 0.75 |
| 180 | 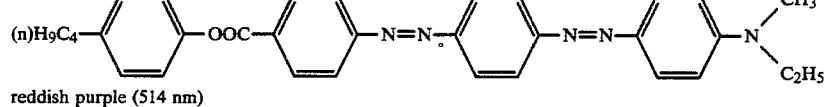<br>reddish purple (514 nm) | 0.77 |
| 181 | 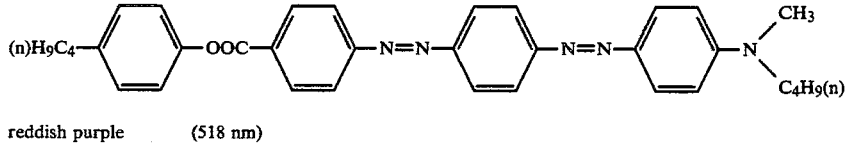<br>reddish purple (518 nm) | 0.77 |
| 182 | 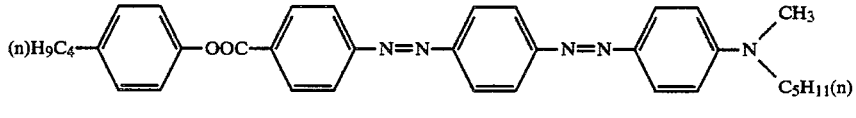<br>reddish purple (515 nm) | 0.76 |
| 183 | 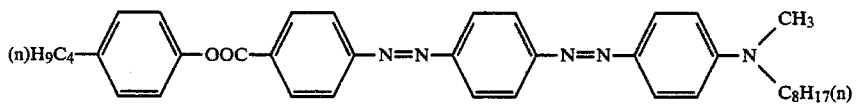<br>reddish purple (515 nm) | 0.76 |
| 184 | 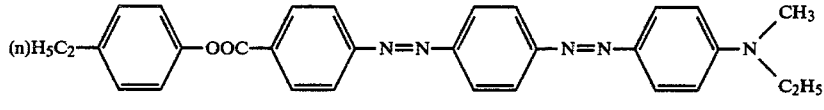<br>reddish purple (514 nm) | 0.79 |
| 185 | 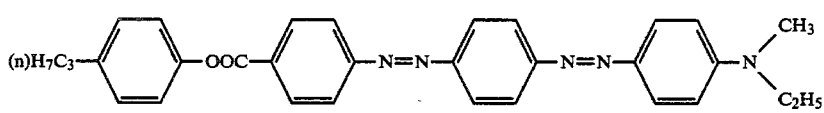<br>reddish purple (516 nm) | 0.78 |
| 186 | 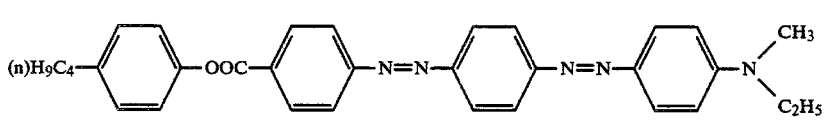<br>reddish purple (514 nm) | 0.77 |

187 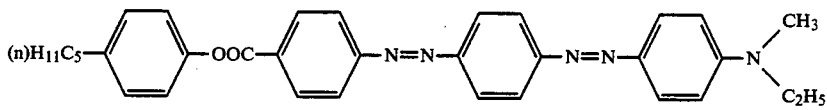 0.78
reddish purple (518 nm)
188 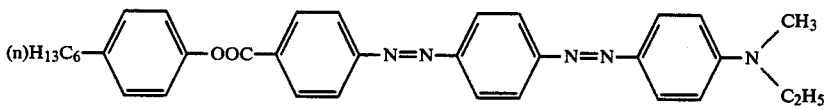 0.78
reddish purple (518 nm)
189 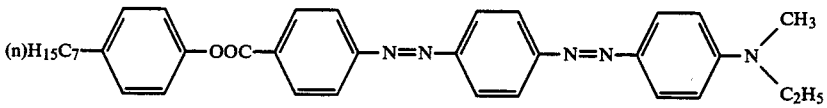 0.78
reddish purple (514 nm)
190 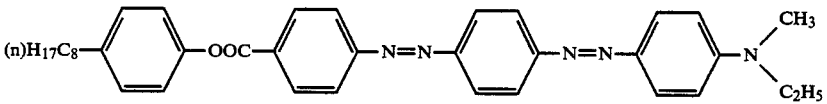 0.79
reddish purple (514 nm)
191 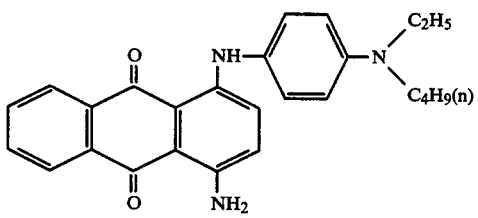 0.60
blue (624 nm)
192 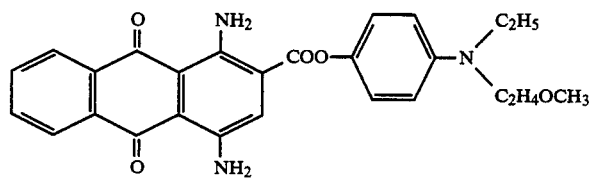 0.76
blue (642 nm)
193 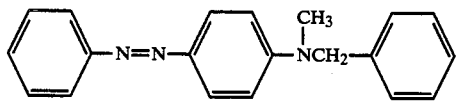 0.62
yellow
194 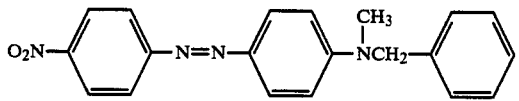 0.61
bitter orange
195 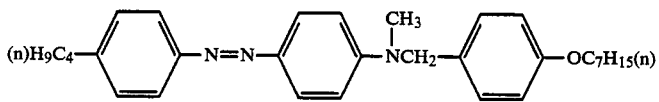 0.64
yellow

| No. | Structure | Value |
|---|---|---|
| 196 | (H₃C)(H₅C₂)CH–C₆H₄–N=N–C₆H₄–N(CH₃)(CH₂–C₆H₅) — yellow | 0.63 |
| 197 | (n)H₉C₄OOC–C₆H₄–N=N–C₆H₄–N(CH₃)(CH₂–C₆H₅) — yellow | 0.62 |
| 198 | (n)H₁₁C₅O–C₆H₄–C₆H₄–N=N–C₆H₄–N(CH₃)(CH₂–C₆H₅) — yellow | 0.70 |
| 199 | NC–C₆H₄–OOC–C₆H₄–N=N–C₆H₄–N(CH₃)(CH₂–C₆H₄–C₄H₉(n)) — yellow | 0.70 |
| 200 | 5-methylbenzoxazol-2-yl–C₆H₄–N=N–C₆H₄–N(CH₃)(CH₂–C₆H₄–C₇H₁₅(n)) — yellow | 0.71 |
| 201 | (n)H₉C₄–C₆H₄–OOC–C₆H₄–N=N–C₆H₄–N(CH₃)(CH₂–C₆H₅) — yellow | 0.69 |
| 202 | (n)H₉C₄–C₆H₄–CH₂N(CH₃)–C₆H₄–N=N–C₆H₄–N(CH₃)(CH₂–C₆H₄–C₄H₉(n)) — yellow | 0.60 |
| 203 | NC–C₆H₄–N=N–C₆H₄–N(CH₃)(CH₂–C₆H₄–OC₇H₁₅(n)) — yellow | 0.61 |
| 204 | H₃COCHN–C₆H₄–N=N–C₆H₄–N(CH₃)(CH₂–C₆H₅) — yellow | 0.60 |
| 205 | (n)H₇C₃OOC–C₆H₄–N=N–C₆H₃(OH)–N(CH₃)(CH₂–C₆H₅) — bitter orange | 0.64 |

| No. | Structure | Value |
|---|---|---|
| 206 | (n)H₉C₄–[H]–C₆H₄–N=N–C₆H₄–N(CH₃)(CH₂C₆H₅); yellow | 0.70 |
| 207 | (n)H₉C₄–C₆H₄–OOC–C₆H₄–N=N–C₆H₄–N(CH₃)(CH₂C₆H₅); yellow | 0.69 |
| 208 | (n)H₉C₄OOC–C₆H₄–N=N–C₆H₄–N(CH₃)(CH₂C₆H₅); yellow | 0.59 |
| 209 | (n)H₉C₄–[H]–OCO–C₆H₄–N=N–C₆H₄–N(CH₃)(CH₂C₆H₅); yellow | 0.69 |
| 210 | (n)H₉C₄–[H]–CH₂O–C₆H₄–N=N–C₆H₄–N(CH₃)(CH₂C₆H₅); yellow | 0.67 |
| 211 | (n)H₂₅C₁₂–C₆H₄–CONH–C₆H₄–N=N–C₆H₄–N(CH₃)(CH₂C₆H₅); yellow | 0.68 |
| 212 | (n)H₃₇C₁₈–C₆H₄–CON(CH₃)–C₆H₄–N=N–C₆H₄–N(CH₃)(CH₂C₆H₅); yellow | 0.64 |
| 213 | (n)H₉C₄O–[H]–(dioxane)–C₆H₄–N=N–C₆H₄–N(CH₃)(CH₂C₆H₅); yellow | 0.70 |
| 214 | (n)H₉C₄–[H]–(bicyclo)–C₆H₄–N=N–C₆H₄–N(CH₃)(CH₂C₆H₅); yellow | 0.71 |
| 215 | (n)H₉C₄O–C₆H₄–(pyrazine)–C₆H₄–N=N–C₆H₄–N(CH₃)(CH₂C₆H₅); yellow | 0.75 |

-continued
216 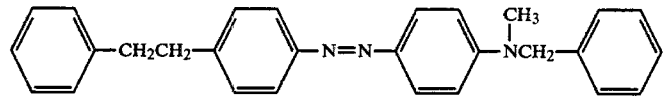 0.65
yellow
217 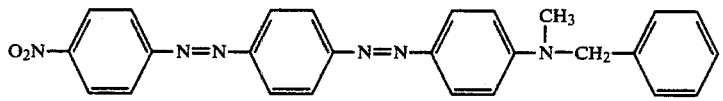 0.70
red
218 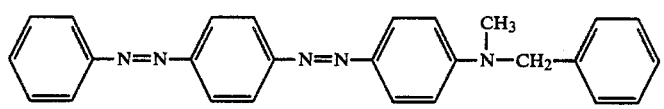 0.70
bitter orange (481 nm)
219 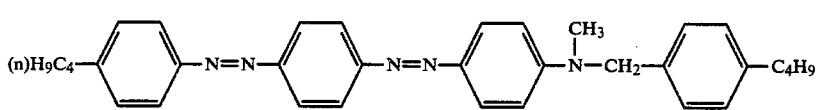 0.74
bitter orange
220 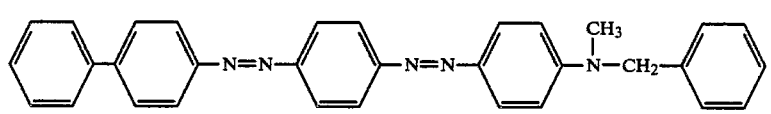 0.76
bitter orange
221 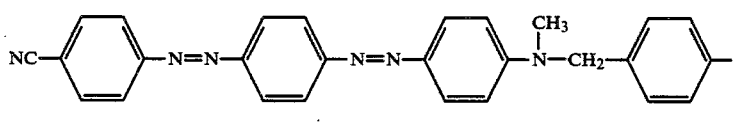 0.74
red
222 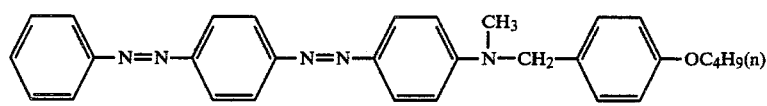 0.71
bitter orange (486 nm)
223 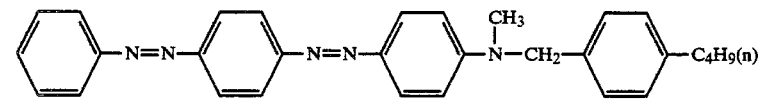 0.71
bitter orange
224 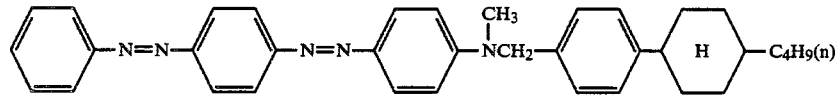 0.71
bitter orange
225 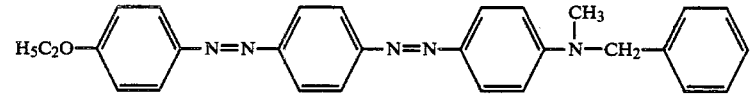 0.75
bitter orange -continued

| No. | Structure | Value |
|---|---|---|
| 226 | F–C₆H₄–N=N–C₆H₄–N=N–C₆H₄–N(CH₃)–CH₂–C₆H₄–OC₄H₉(n)<br>bitter orange (486 nm) | 0.69 |
| 227 | O₂N–C₆H₄–N=N–C₆H₂(OCH₃)₂–N=N–C₆H₄–N(CH₃)–CH₂–C₆H₅<br>red | 0.67 |
| 228 | (n)H₉C₄–C₆H₄–N=N–(naphthalene-1,4-diyl)–N=N–C₆H₄–N(CH₃)–CH₂–C₆H₅<br>reddish purple (520 nm) | 0.72 |
| 229 | (n)H₉C₄–C₆H₄–C₆H₄–N=N–(naphthalene-1,4-diyl)–N=N–C₆H₄–N(CH₃)–CH₂–C₆H₅<br>reddish purple | 0.76 |
| 230 | (n)H₁₇C₈O₂S–C₆H₄–N=N–(naphthalene-1,4-diyl)–N=N–C₆H₄–N(CH₃)–CH₂–C₆H₅<br>purple | 0.72 |
| 231 | (n)H₉C₄–C₆H₄–OOC–C₆H₄–N=N–C₆H₄–N=N–C₆H₄–N(CH₃)–CH₂–C₆H₅<br>reddish purple (506 nm) | 0.78 |
| 232 | NC–C₆H₄–OOC–C₆H₄–N=N–C₆H₄–N=N–C₆H₄–N(CH₃)–CH₂–C₆H₄–C₄H₉(n)<br>red | 0.76 |
| 233 | (n)H₉C₄–(C₆H₁₀)–OOC–C₆H₄–N=N–C₆H₄–N=N–C₆H₄–N(CH₃)–CH₂–C₆H₅<br>red | 0.73 |

-continued
| 234 | 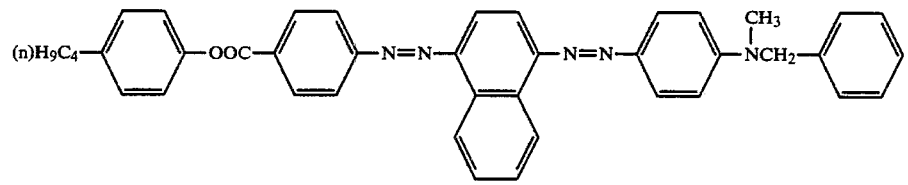 | 0.76 |
purple (546 nm)
| 235 | 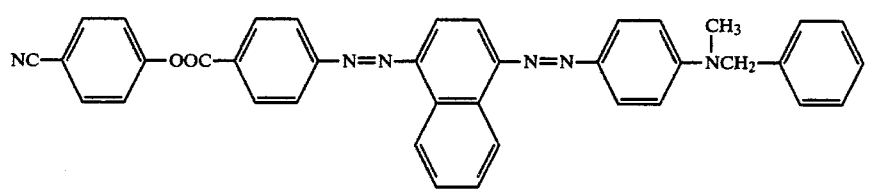 | 0.76 |
purple
| 236 | 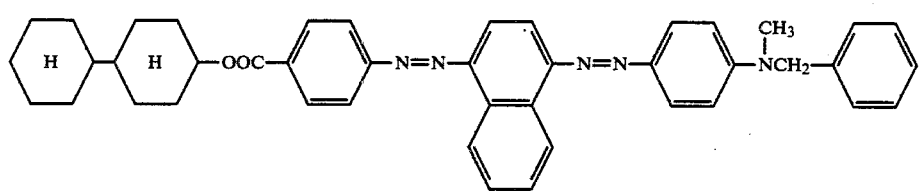 | 0.75 |
purple
| 237 | 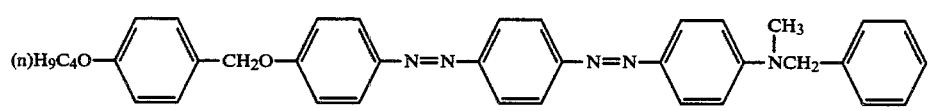 | 0.74 |
bitter orange
| 238 | 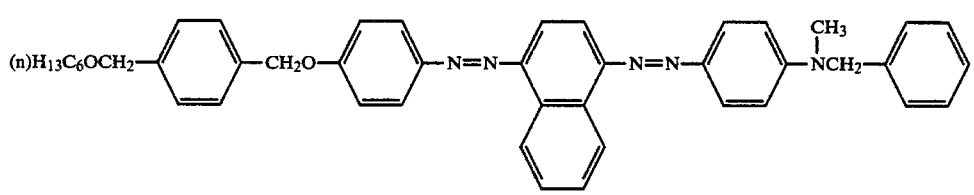 | 0.74 |
reddish purple
| 239 | 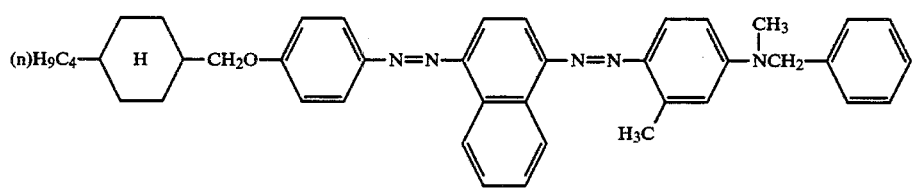 | 0.71 |
reddish purple
| 240 | 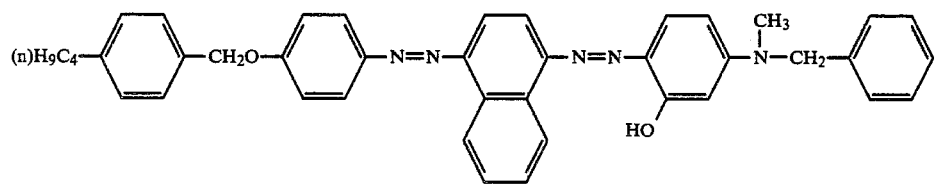 | 0.72 |
purple

| | 73 | 74 | |
|---|---|---|---|
| 241 | 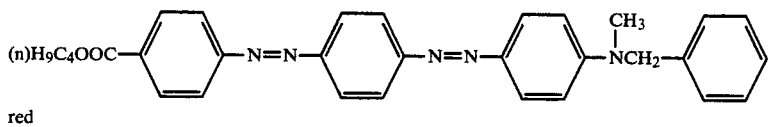 red | | 0.76 |
| 242 | 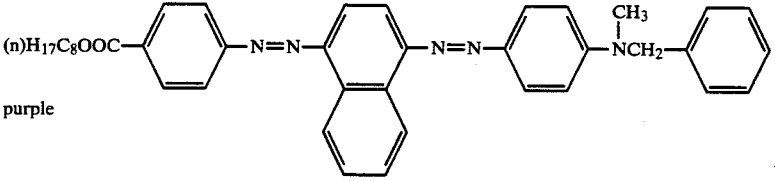 purple | | 0.74 |
| 243 | 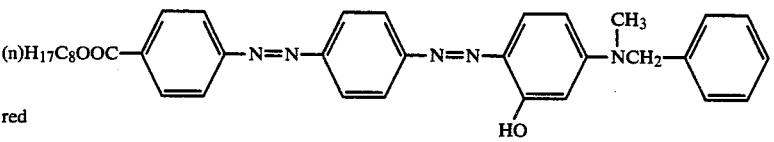 red | | 0.73 |
| 244 | 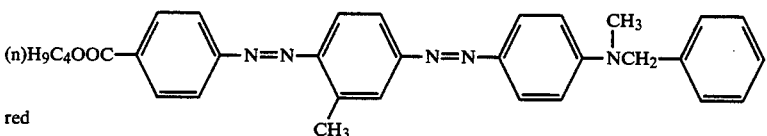 red | | 0.69 |
| 245 | 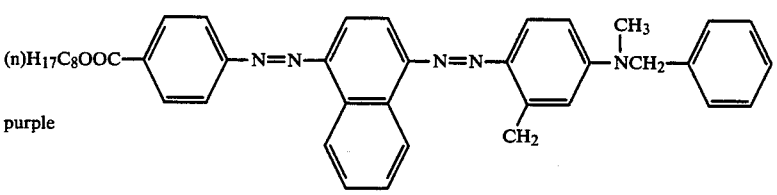 purple | | 0.70 |
| 246 | 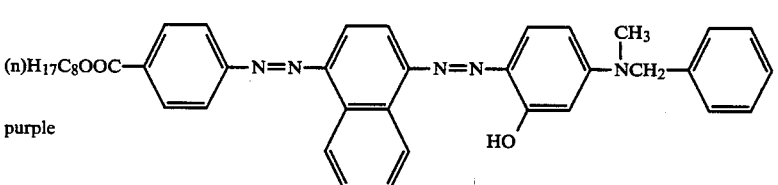 purple | | 0.73 |
| 247 | 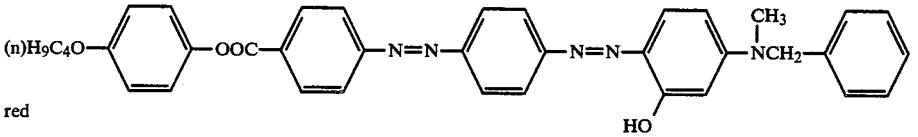 red | | 0.74 |
| 248 | 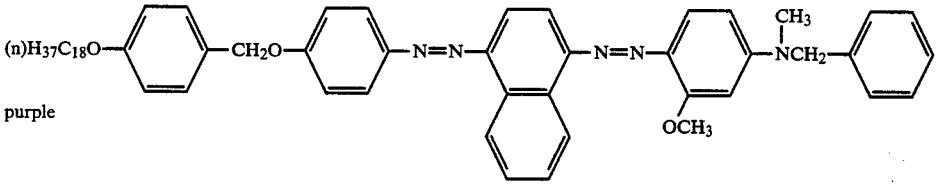 purple | | 0.69 |
| 249 | 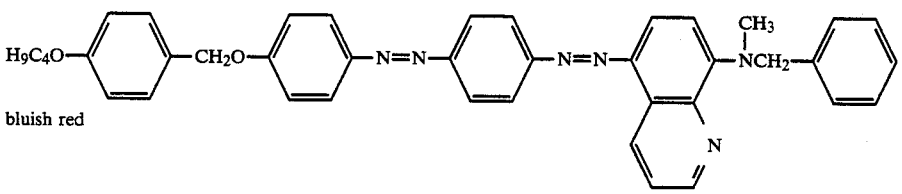 bluish red | | 0.72 |

-continued

| No. | Structure | Value |
|---|---|---|
| 250 | (n)H₉C₄O—⟨phenyl⟩—CH₂O—⟨phenyl⟩—CH₂O—⟨phenyl⟩—N=N—⟨naphthyl⟩—N=N—⟨phenyl⟩—N(CH₃)(CH₂—phenyl) reddish purple | 0.75 |
| 251 | (n)H₉C₄—⟨phenyl⟩—⟨phenyl⟩—CH₂O—⟨phenyl⟩—N=N—⟨naphthyl⟩—N=N—⟨phenyl⟩—N(CH₃)(CH₂—phenyl) reddish purple | 0.75 |
| 252 | (n)H₉C₄—⟨cyclohexyl-H⟩—⟨phenyl⟩—CH₂O—⟨phenyl⟩—N=N—⟨naphthyl⟩—N=N—⟨phenyl⟩—N(CH₃)(CH₂—phenyl) reddish purple | 0.74 |
| 253 | (n)H₉C₄—⟨cyclohexyl-H⟩—⟨phenyl⟩—CH₂O—⟨phenyl⟩—N=N—⟨naphthyl⟩—N=N—⟨phenyl⟩—N(CH₃)(CH₂—phenyl) reddish purple | 0.74 |
| 254 | (n)H₉C₄—⟨cyclohexyl-H⟩—⟨cyclohexyl-H⟩—CH₂O—⟨phenyl⟩—N=N—⟨naphthyl⟩—N=N—⟨phenyl⟩—N(CH₃)(CH₂—phenyl) reddish purple | 0.75 |
| 255 | ⟨cyclohexyl-H⟩—⟨cyclohexyl-H⟩—CH₂O—⟨phenyl⟩—N=N—⟨naphthyl⟩—N=N—⟨phenyl⟩—N(CH₃)(CH₂—phenyl) reddish purple | 0.73 |
| 256 | (n)H₉C₄—⟨phenyl⟩—CH₂CH₂—⟨phenyl⟩—N=N—⟨naphthyl⟩—N=N—⟨phenyl⟩—N(CH₂—phenyl)(CH₃) reddish purple | 0.74 |
| 257 | (n)H₉C₄—⟨phenyl⟩—SOC—⟨phenyl⟩—N=N—⟨naphthyl⟩—N=N—⟨phenyl⟩—N(CH₃)(—phenyl) purple | 0.75 |

| | | |
|---|---|---|
| 258 | 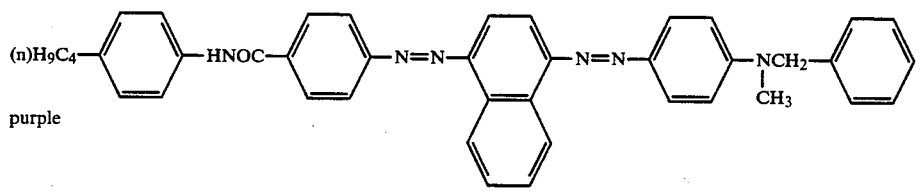 purple | 0.75 |
| 259 | 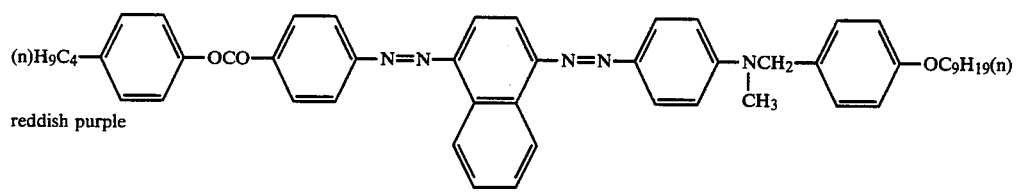 reddish purple | 0.74 |
| 260 | 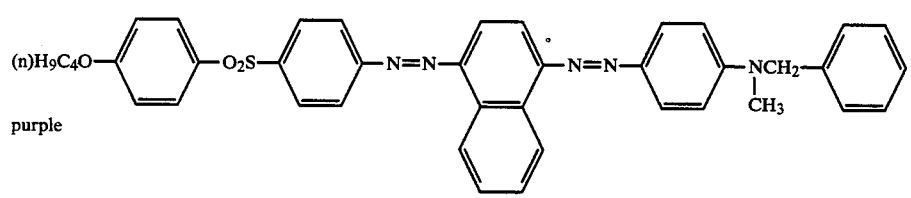 purple | 0.72 |
| 261 | 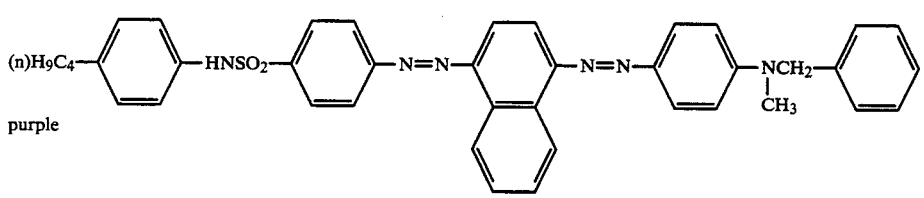 purple | 0.73 |
| 262 | 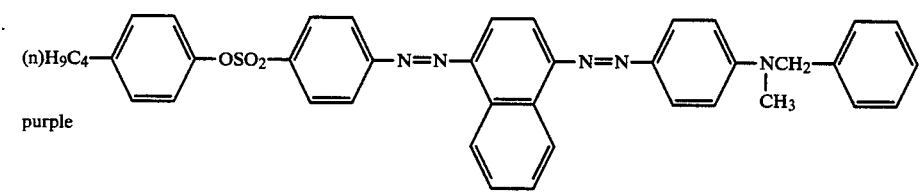 purple | 0.73 |
| 263 | 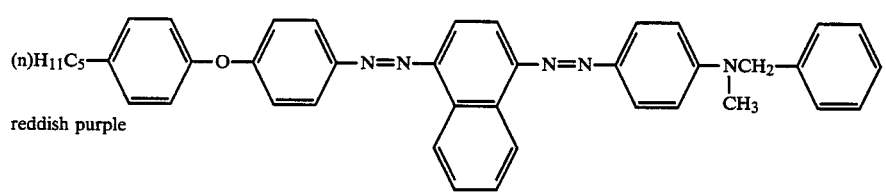 reddish purple | 0.71 |
| 264 | 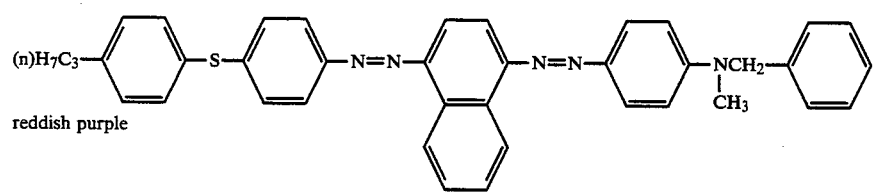 reddish purple | 0.69 |
| 265 | 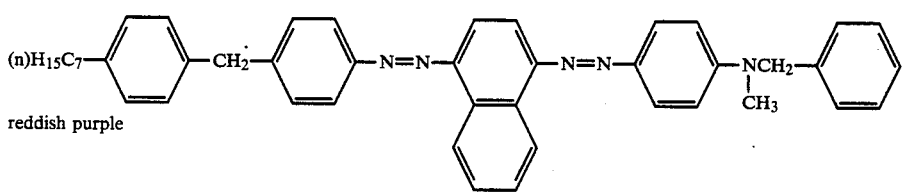 reddish purple | 0.70 |

| # | Structure | Value |
|---|---|---|
| 266 | reddish purple — (H5C2)(n)H7C3CHCH2—C6H4—NH—C6H4—N=N—(naphthalene)—N=N—C6H4—N(CH2C6H5)(CH3) | 0.70 |
| 267 | reddish purple — (n)H9C4OCH2—C6H4—N=N—(naphthalene)—N=N—C6H4—N(CH2C6H5)(CH3) | 0.73 |
| 268 | reddish purple — (n)H7C3CH4C2OCH2—C6H4—N=N—(naphthalene)—N=N—C6H4—N(CH2C6H5)(CH3) | 0.72 |
| 269 | yellow — (H3CO)2-triazine—N=N—C6H4—N(CH2C6H5)(CH3) | 0.59 |
| 270 | reddish purple — (H3CO)2-triazine—N=N—(naphthalene)—N=N—C6H4—N(CH2C6H5)(CH3) | 0.75 |
| 271 | purple — (n)H13C6O—C6H4—OOC—C6H4—N=N—(naphthalene)—N=N—C6H3(OCH3)—N(CH2C6H5)(CH3) | 0.72 |
| 272 | reddish blue — (n)H13C6O—C6H4—OOC—C6H4—N=N—C6H4—N=N—(naphthalene)—N=N—C6H4—N(CH2C6H5)(CH3) | 0.77 |
| 273 | purple — C6H5CH2(CH3)N—C6H3(CH3)—N=N—C6H3(Cl)—N=N—C6H3(Cl)—N=N—C6H3(CH3)—N(CH2C6H5)(CH3) | 0.74 |

| # | Structure (description) | Value |
|---|---|---|
| 274 | purple — bis(benzyl-methylamino-phenyl)-azo with two Cl-substituted phenyl-azo linkers | 0.75 |
| 275 | bluish purple — (n)H₉C₄-phenyl-azo-phenyl-azo-naphthyl-azo-phenyl-N(CH₃)CH₂-phenyl-C₆H₁₃ | 0.76 |
| 276 | blue — (n)H₉C₄O₂S-phenyl-azo-phenyl-azo-naphthyl-azo-(methyl)phenyl-N(CH₃)CH₂-phenyl | 0.72 |
| 277 | blue — (n)H₉C₄O₂S-phenyl-azo-phenyl-azo-naphthyl-azo-phenyl-N(CH₃)CH₂-phenyl | 0.74 |
| 278 | purple — (n)H₉C₄-phenyl-azo-phenyl-azo-(methyl)phenyl-azo-phenyl-N(CH₃)CH₂-phenyl | 0.76 |
| 279 | purple — NO-phenyl-azo-phenyl-azo-(methyl)phenyl-azo-phenyl-N(CH₃)CH₂-phenyl | 0.76 |
| 280 | red — (n)H₉C₄-cyclohexyl-phenyl-azo-phenyl-azo-phenyl-azo-phenyl-N(CH₃)CH₂-phenyl | 0.78 |
| 281 | red — (n)H₉C₄-biphenyl-azo-phenyl-azo-phenyl-azo-phenyl-N(CH₃)CH₂-phenyl | 0.78 |
| 282 | red — (n)H₉C₄-bicyclooctyl-phenyl-azo-phenyl-azo-phenyl-azo-phenyl-N(CH₃)CH₂-phenyl | 0.77 |
| 283 | red — (n)H₁₅C₇O-phenyl-CH₂N(CH₃)-phenyl-azo-phenyl- | 0.76 |

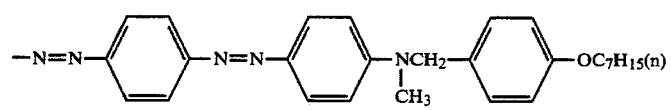
| | | |
|---|---|---|
| 284 | reddish blue | 0.74 |
| 285 | yellow | 0.71 |
| 286 | yellow | 0.71 |
| 287 | yellow | 0.71 |
| 288 | red | 0.77 |
| 289 | yellow | 0.73 |
| 290 | yellow | 0.74 |
| 291 | yellowish bitter orange | 0.70 |

-continued
| | | |
|---|---|---|
| 292 | 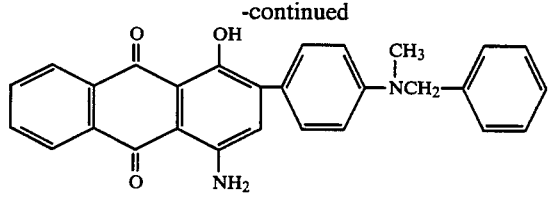 reddish purple | 0.72 |
| 293 | 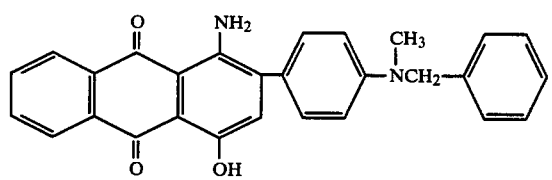 reddish purple | 0.72 |
| 294 | 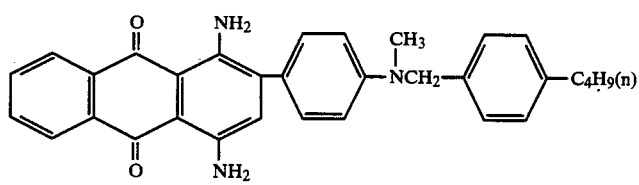 purple | 0.73 |
| 295 | 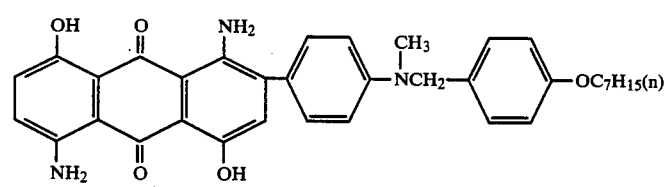 blue | 0.72 |
| 296 | 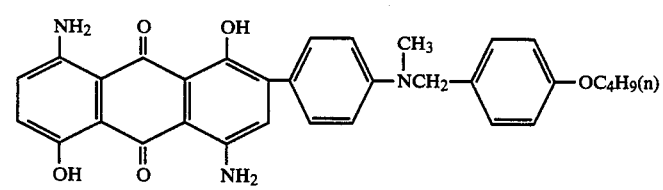 blue | 0.72 |
| 297 | 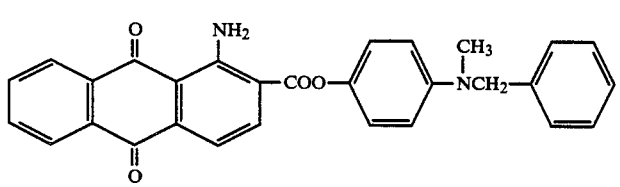 bitter orange | 0.75 |
| 298 | 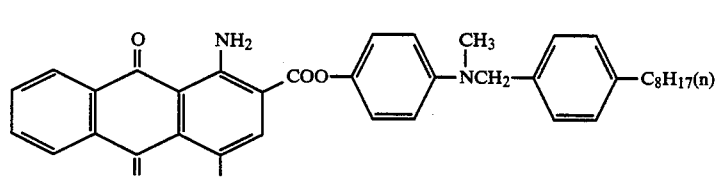 purple | 0.72 |
| 299 | 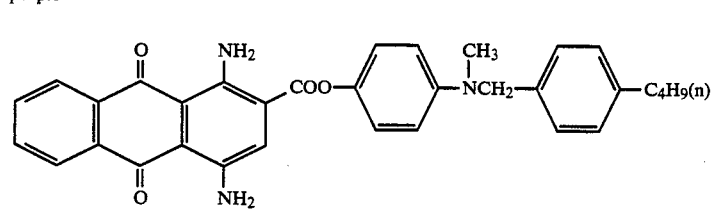 blue | 0.76 |

| | | |
|---|---|---|
| 300 | 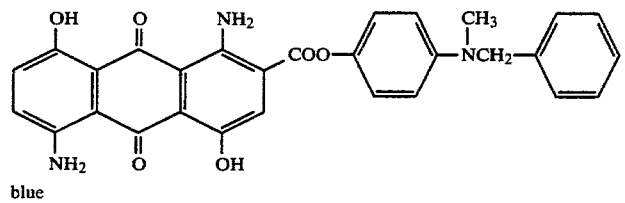<br>blue | 0.75 |
| 301 | 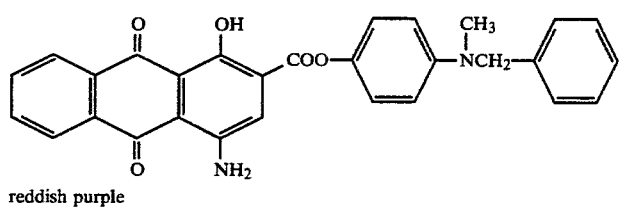<br>reddish purple | 0.73 |
| 302 | 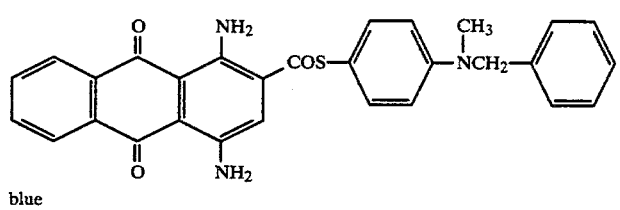<br>blue | 0.73 |
| 303 | 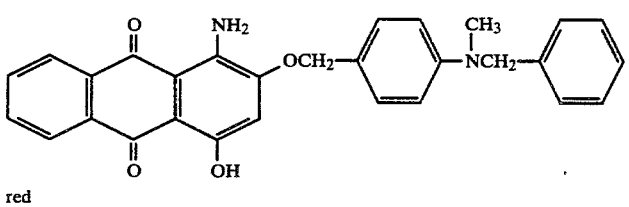<br>red | 0.69 |
| 304 | 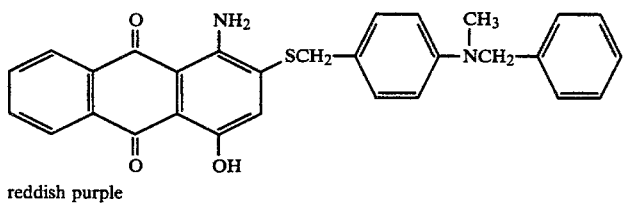<br>reddish purple | 0.73 |
| 305 | 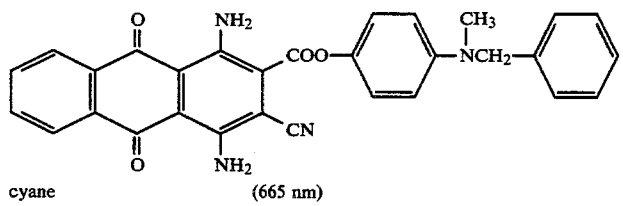<br>cyane           (665 nm) | 0.72 |
| 306 | 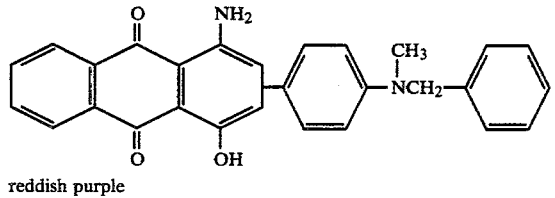<br>reddish purple | 0.74 |

| | | |
|---|---|---|
| 307 | 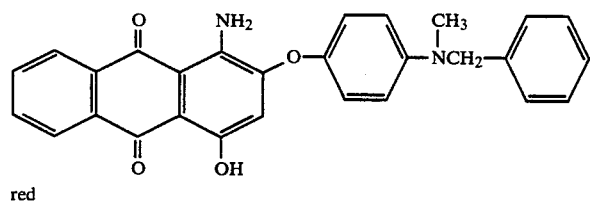<br>red | 0.69 |
| 308 | 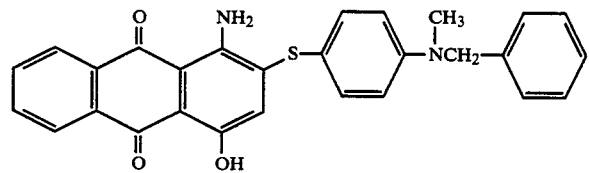<br>reddish purple | 0.59 |
| 309 | 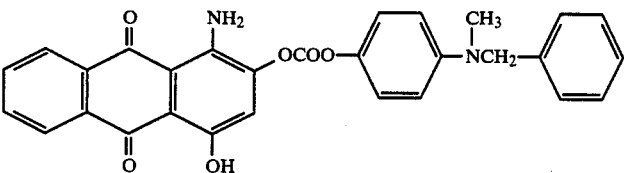<br>bluish purple | 0.61 |
| 310 | 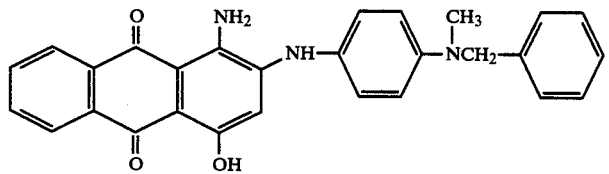<br>red | 0.60 |
| 311 | 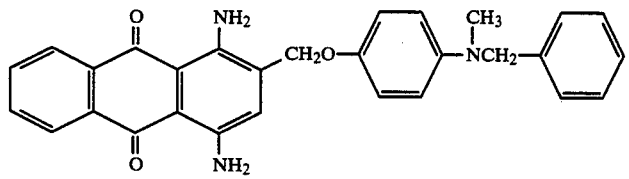<br>purple | 0.72 |
| 312 | 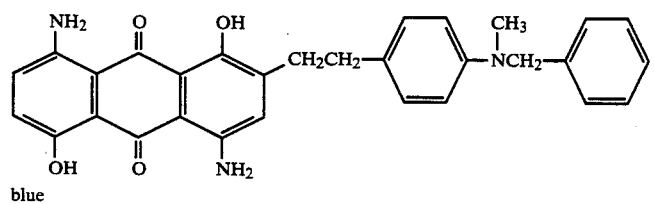<br>blue | 0.73 |
| 313 | 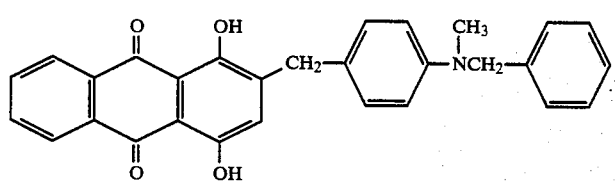<br>yellowish bitter orange | 0.65 |

| | | |
|---|---|---|
| 314 | 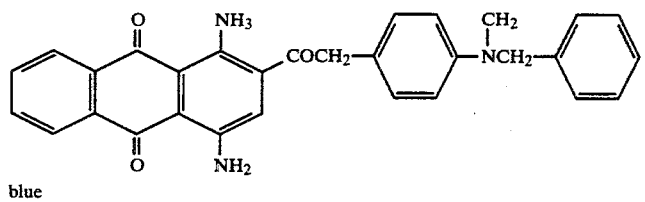<br>blue | 0.70 |
| 315 | 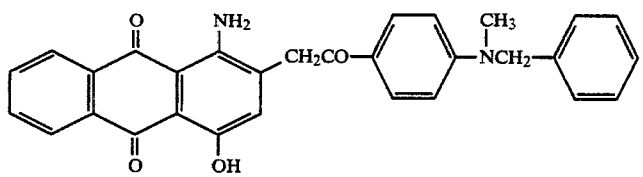<br>reddish purple | 0.73 |
| 316 | 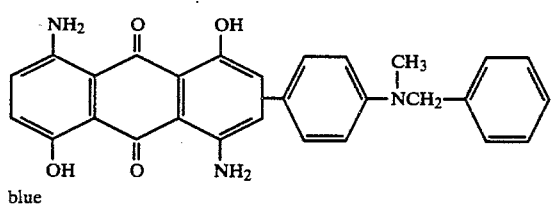<br>blue | 0.74 |
| 317 | 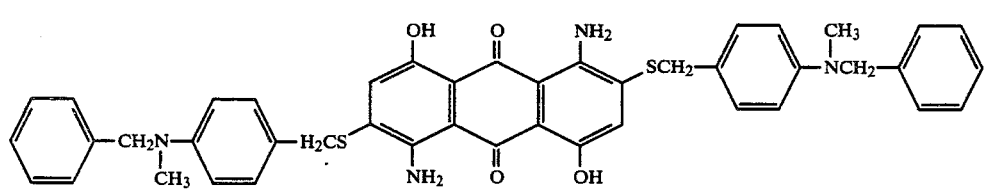<br>blue | 0.74 |
| 318 | 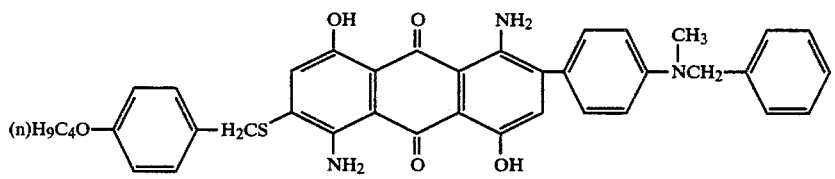<br>blue | 0.74 |
| 319 | 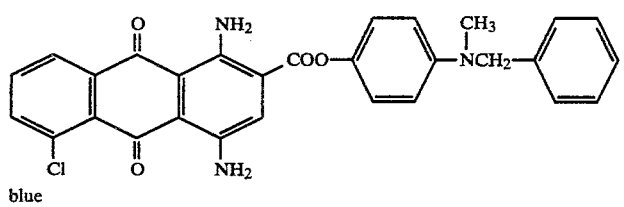<br>blue | 0.73 |
| 320 | 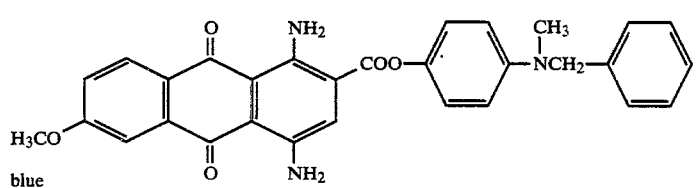<br>blue | 0.74 |

| | | |
|---|---|---|
| 321 | 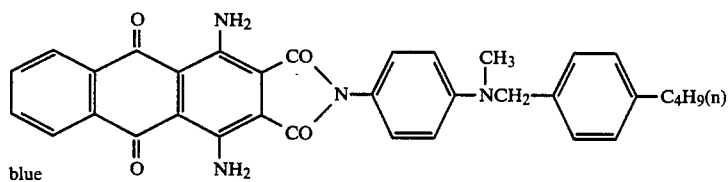 blue | 0.74 |
| 322 | 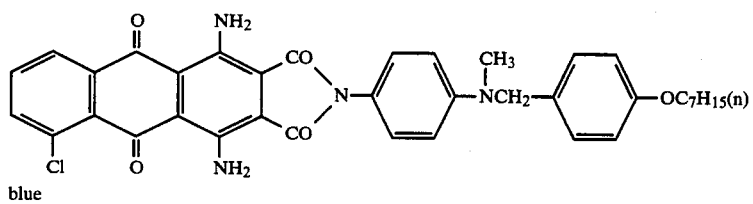 blue | 0.73 |
| 323 | 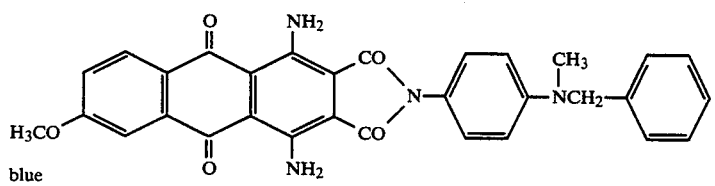 blue | 0.71 |
| 324 | 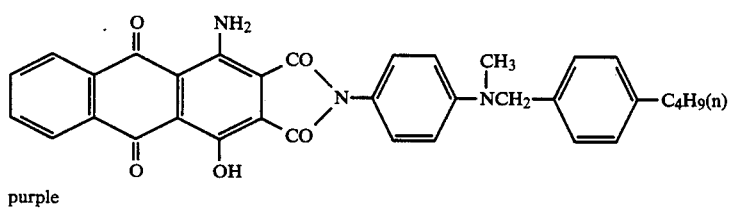 purple | 0.72 |
| 325 | 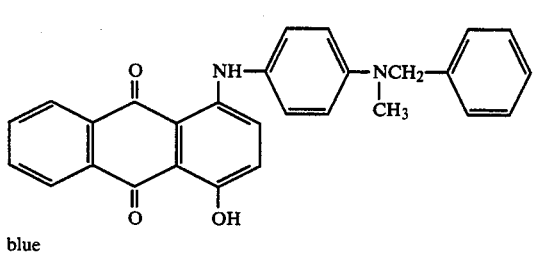 blue | 0.60 |
| 326 | 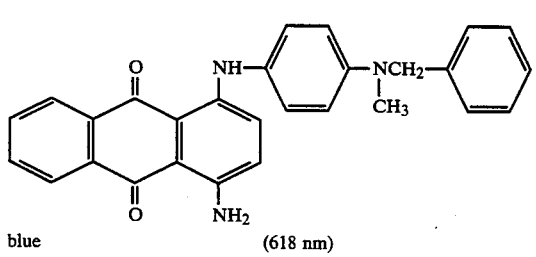 blue (618 nm) | 0.61 |
| 327 | 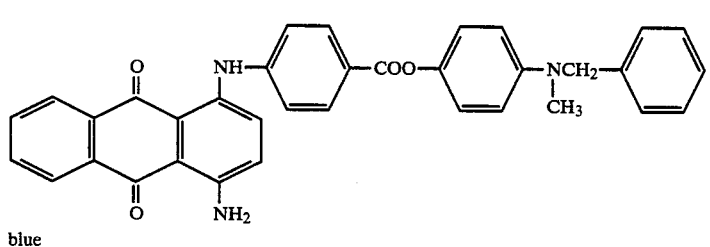 blue | 0.70 |

| | | |
|---|---|---|
| 328 | 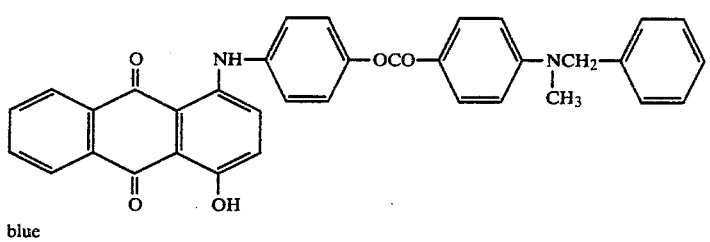 blue | 0.69 |
| 329 | 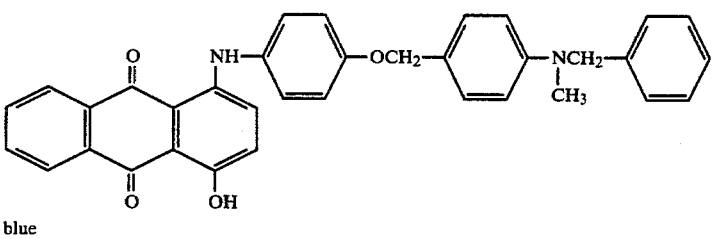 blue | 0.69 |
| 330 | 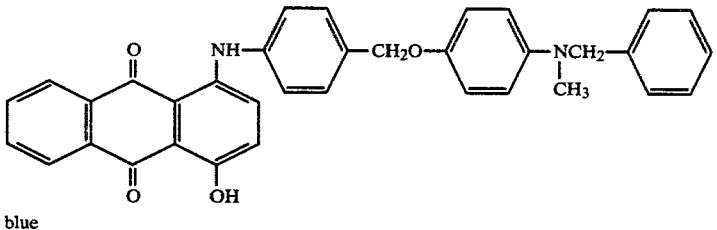 blue | 0.66 |
| 331 | 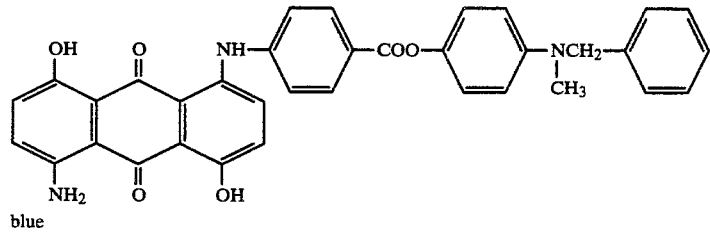 blue | 0.71 |
| 332 | 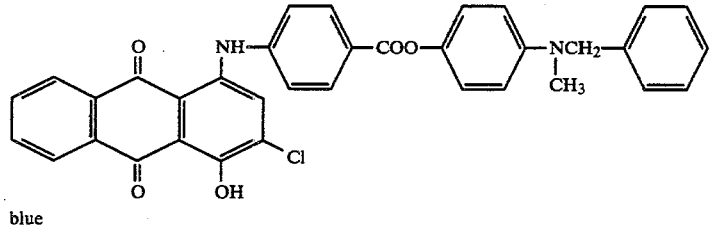 blue | 0.69 |
| 333 | 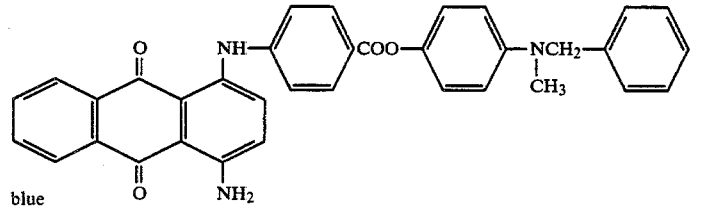 blue | 0.70 |

334 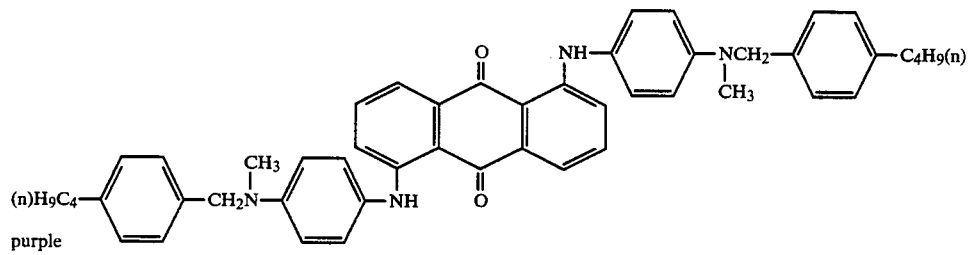 0.72
purple
335 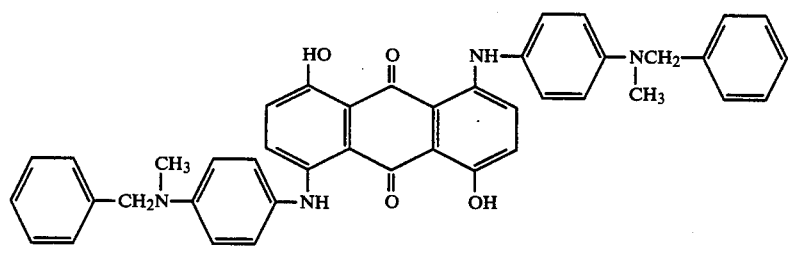 0.65
blue
336 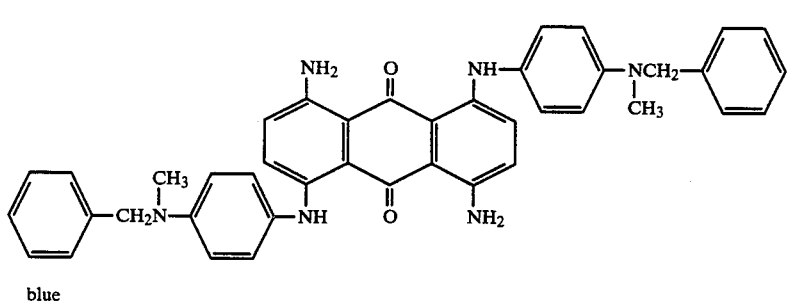 0.67
blue
337 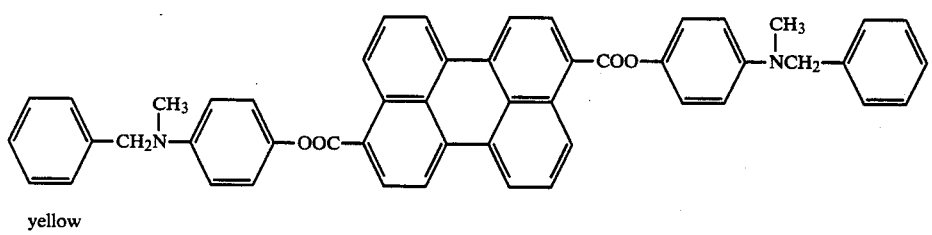 0.71
yellow
338 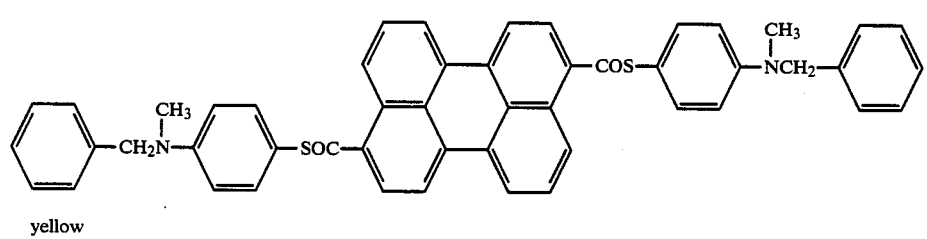 0.72
yellow
339 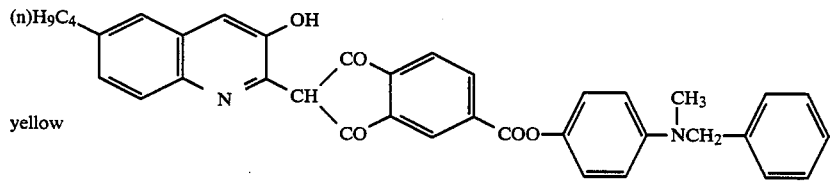 0.69
yellow -continued
| | | |
|---|---|---|
| 340 | 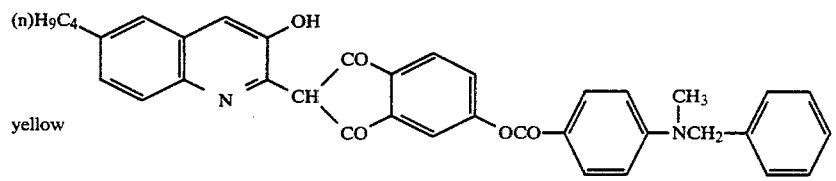 yellow | 0.69 |
| 341 | 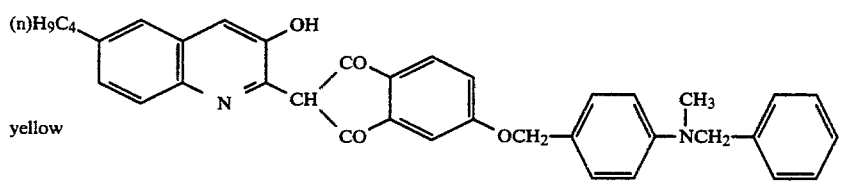 yellow | 0.69 |
| 342 | 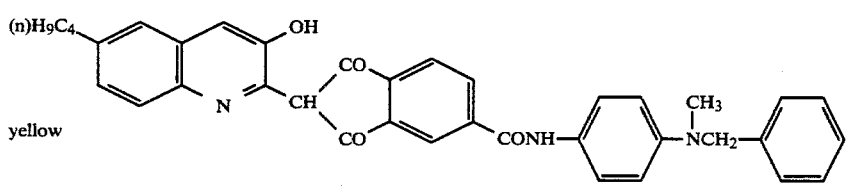 yellow | 0.68 |
| 343 | 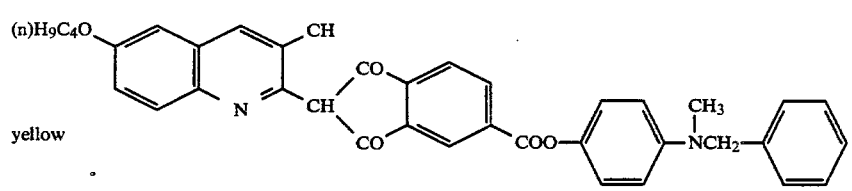 yellow | 0.70 |
| 344 | 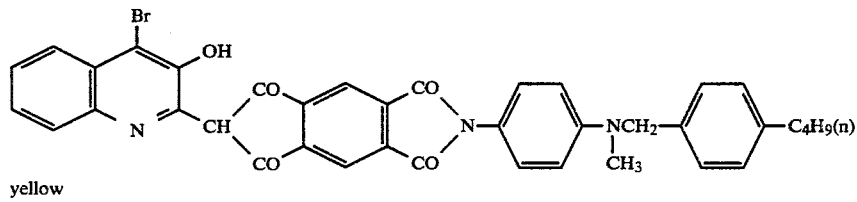 yellow | 0.71 |
| 345 | 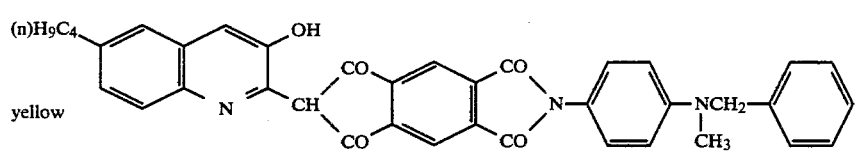 yellow | 0.72 |
| 346 | 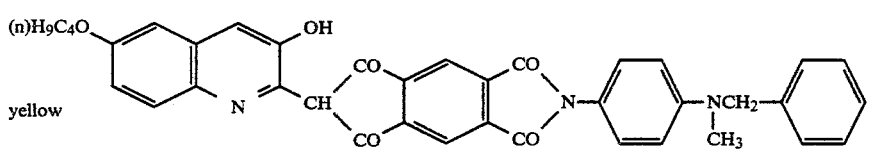 yellow | 0.73 |
| 347 | 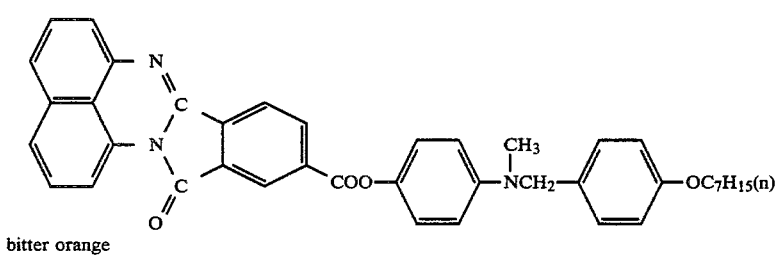 bitter orange | 0.70 |

-continued
348 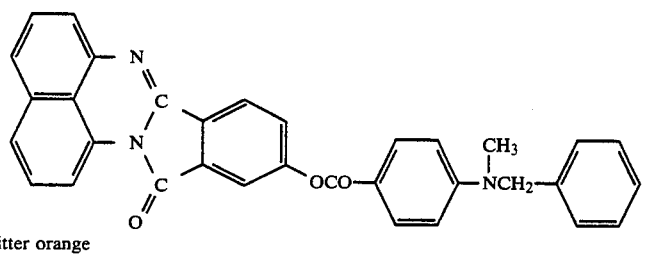
bitter orange
0.69
349 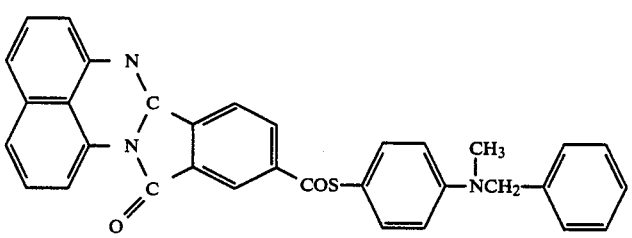
bitter orange
0.71
350 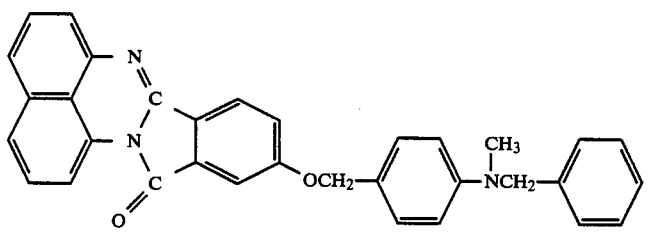
bitter orange
0.68
351 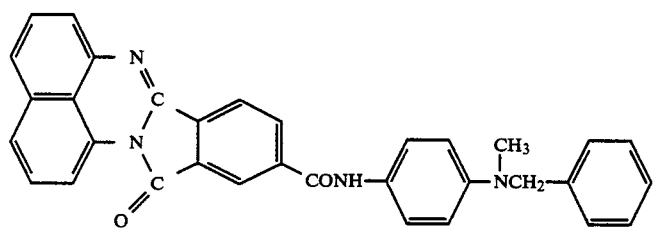
bitter orange
0.63
352 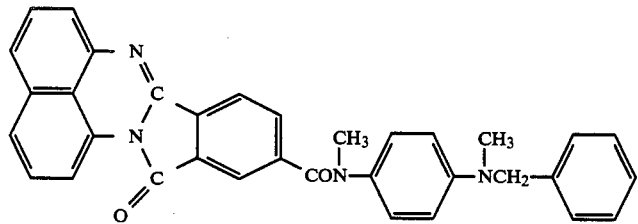
bitter orange
0.61

-continued
| | | |
|---|---|---|
| 353 | 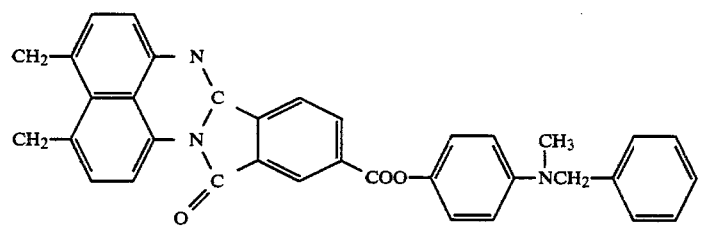  bitter orange | 0.70 |
| 354 | 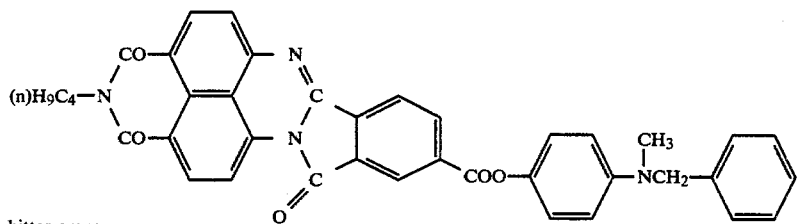  bitter orange | 0.72 |
| 355 | 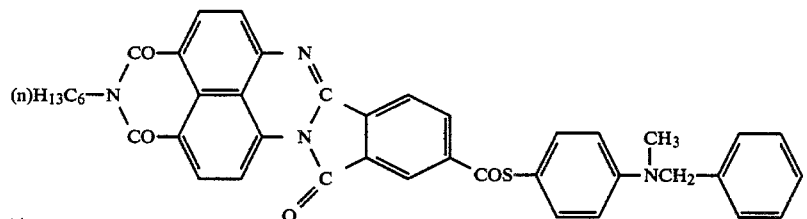  bitter orange | 0.74 |
| 356 | 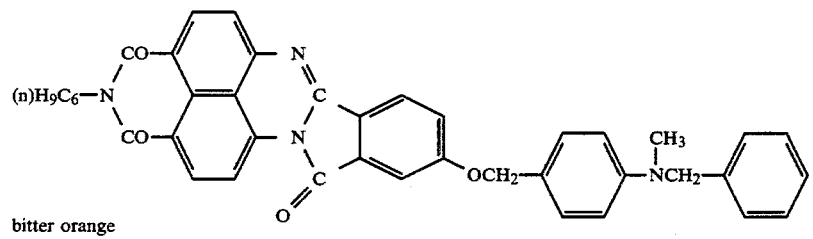  bitter orange | 0.7 |
| 357 | 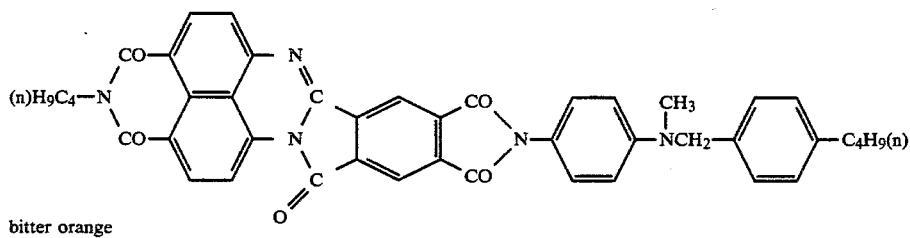  bitter orange | 0.71 |
| 358 | 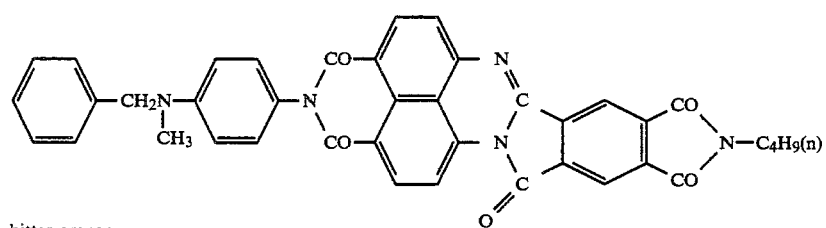  bitter orange | 0.71 |

| | | |
|---|---|---|
| 359 | 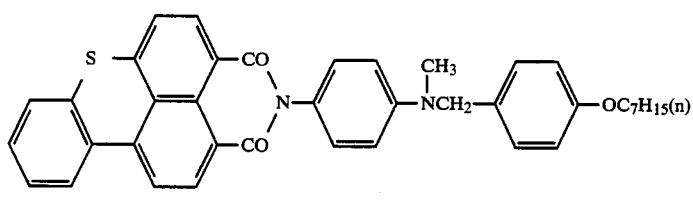 yellow | 0.69 |
| 360 | 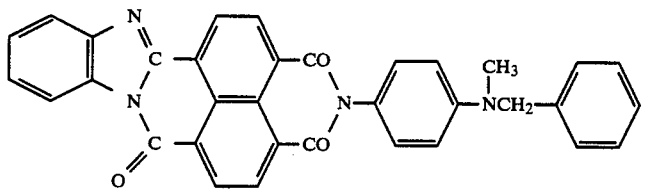 yellowish bitter orange | 0.67 |
| 361 | 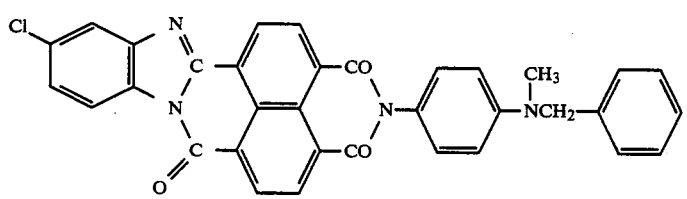 yellow | 0.71 |
| 362 | 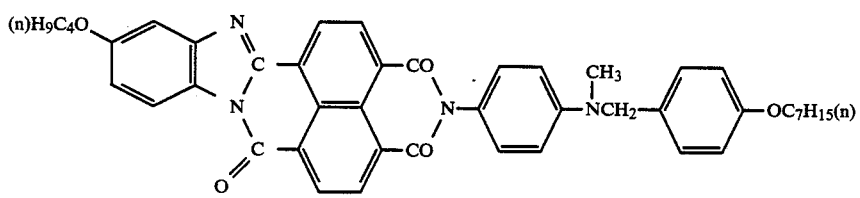 yellow | 0.70 |
| 363 | 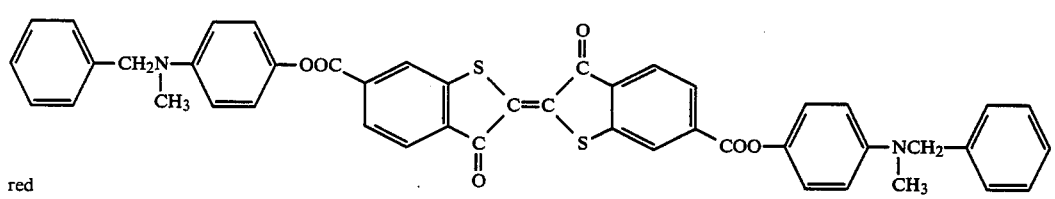 red | 0.70 |
| 364 | 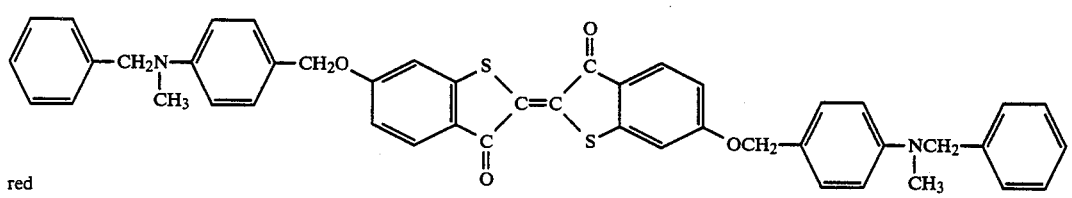 red | 0.72 |
| 365 | 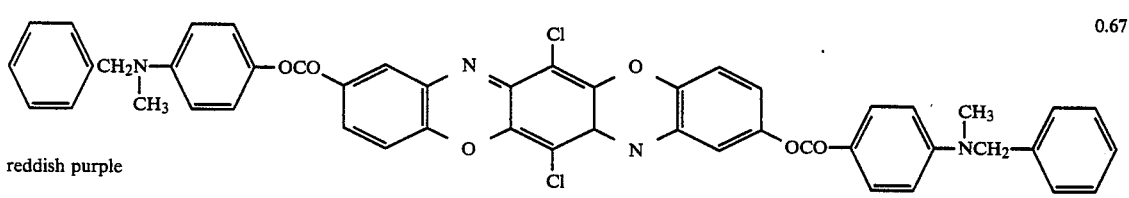 reddish purple | 0.67 |

366 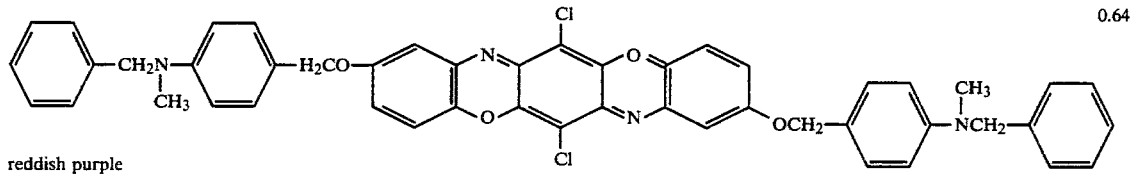 0.64
reddish purple
367 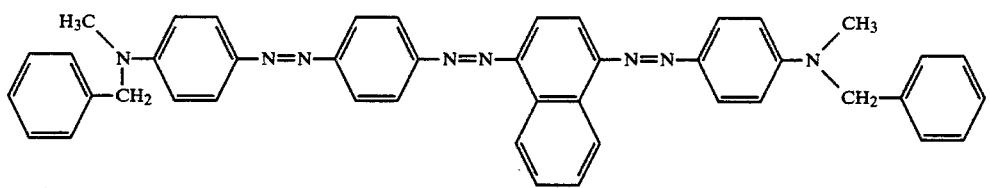 0.77
purple (565 nm)
368 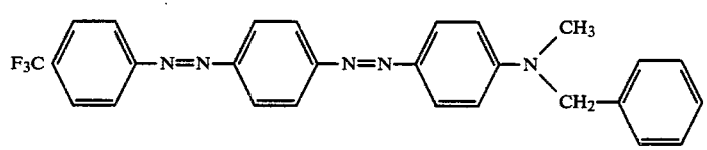 0.75
reddish bitter orange (502 nm)
369 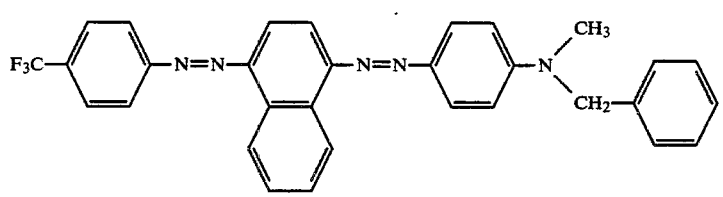 0.69
purple (540 nm)
370 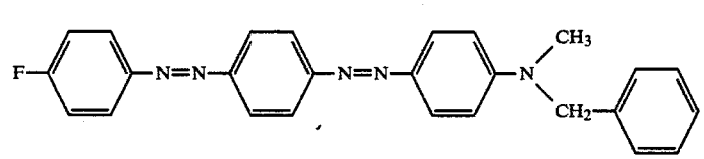 0.69
bitter orange (486 nm)
371 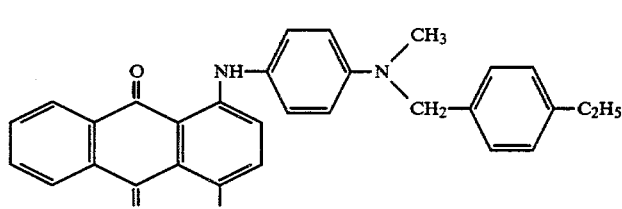 0.60
blue (619 nm)
372 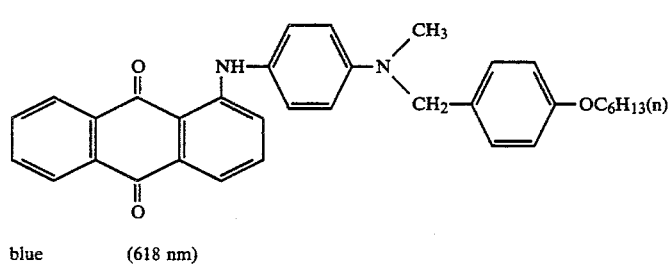 0.59
blue (618 nm)

| | | |
|---|---|---|
| 373 | 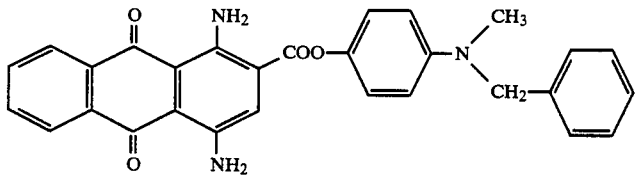 blue (641 nm) | 0.76 |
| 374 | 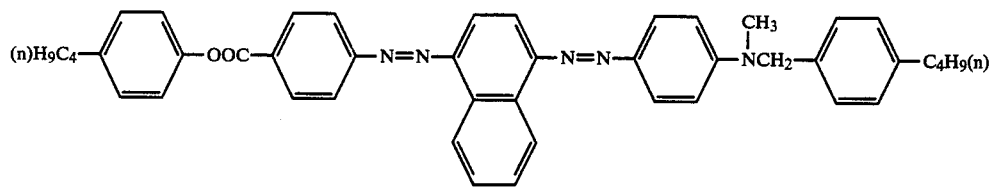 purple | 0.76 |
| 375 | 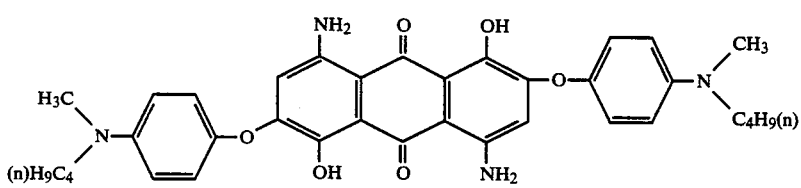 blue | 0.78 |
| 376 | 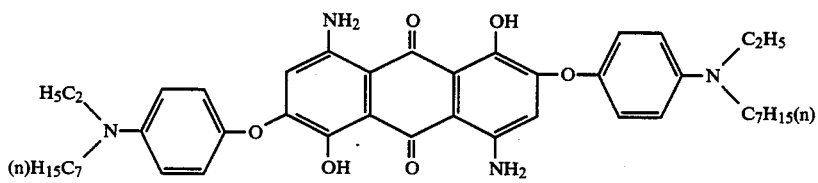 blue | 0.78 |
| 377 | 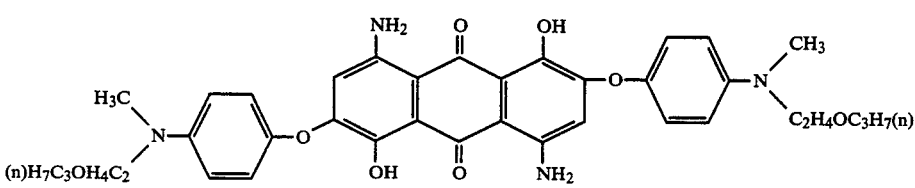 blue | 0.78 |
| 378 | 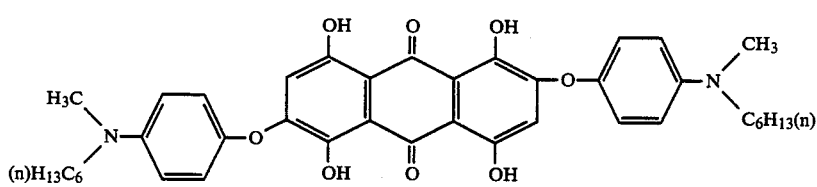 red | 0.78 |
| 379 | 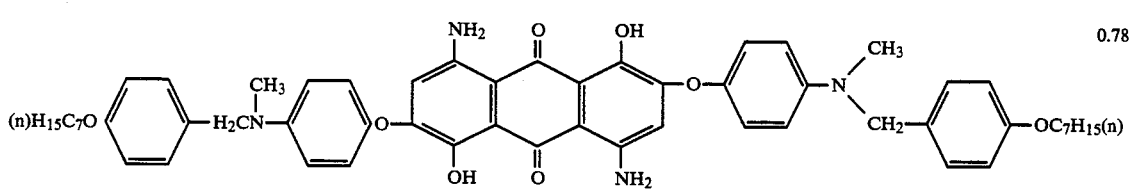 blue | 0.78 |

-continued
C-1 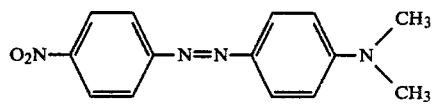 0.65
reddish bitter orange   (487 nm)
C-2 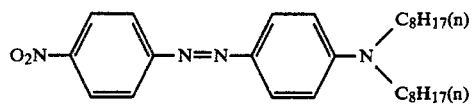 0.54
reddish bitter orange
C-3 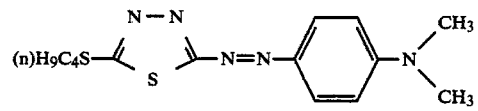 0.70
red   (506 nm)
C-4 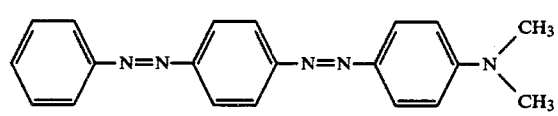 0.72
bitter orange   (490 nm)
C-5 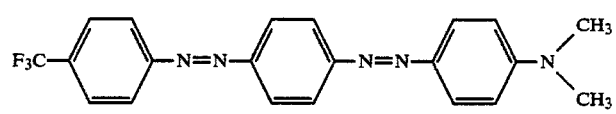 0.76
red   (506 nm)
C-6 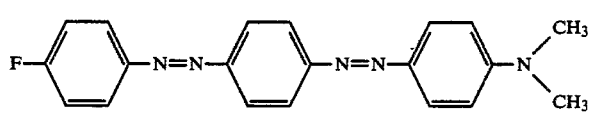 0.70
bitter orange   (491 nm)
C-7 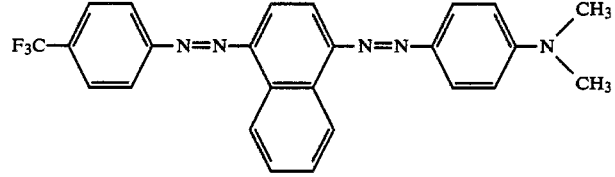 0.72
purple   (544 nm)
C-8 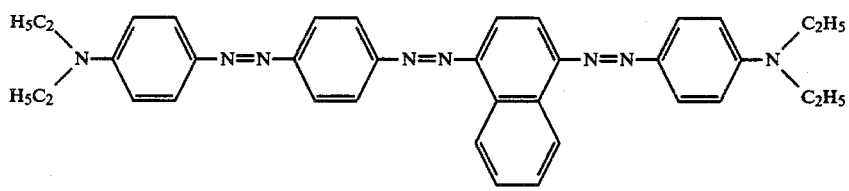 0.76
reddish purple   (573 nm)
C-9 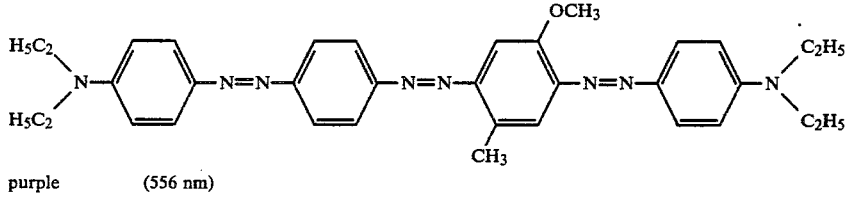 0.74
purple   (556 nm)

Figure 2:
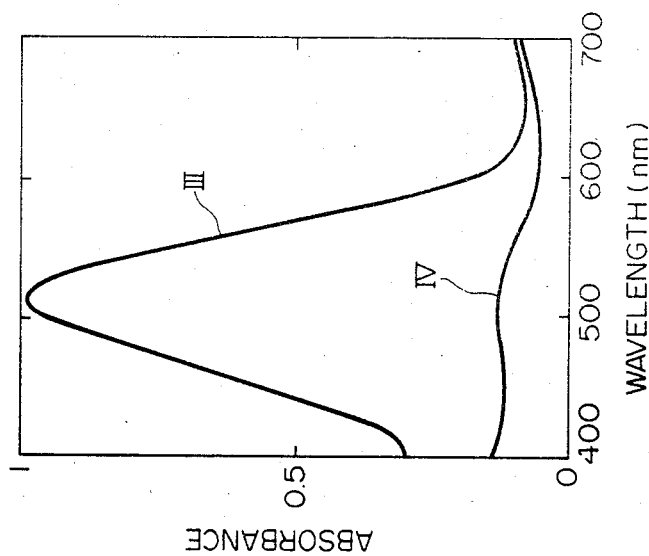
Figure 3:
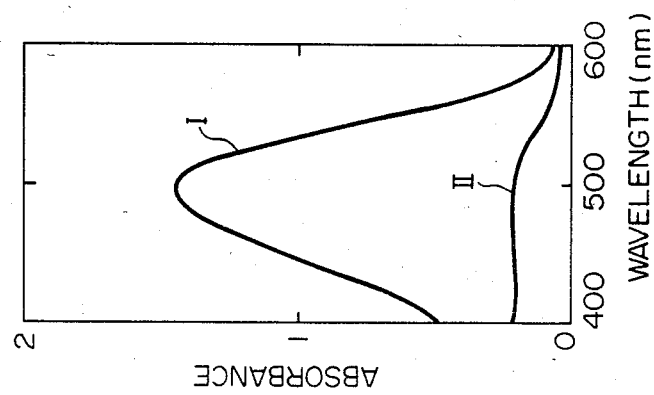
Figure 6:
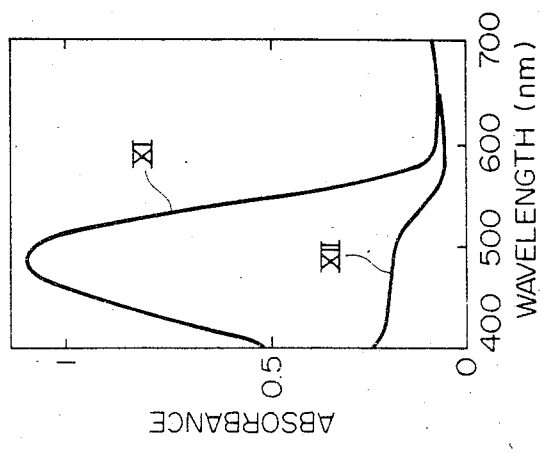
Figure 5:
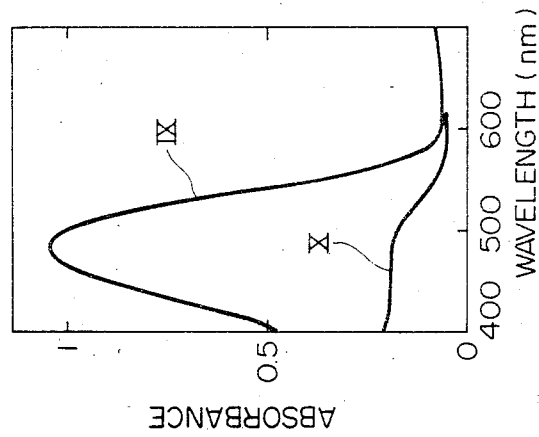
Figure 4:
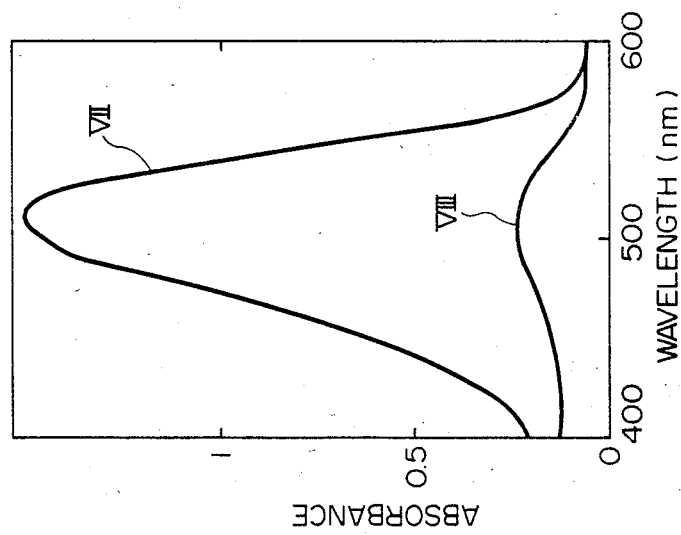
Figure 9:
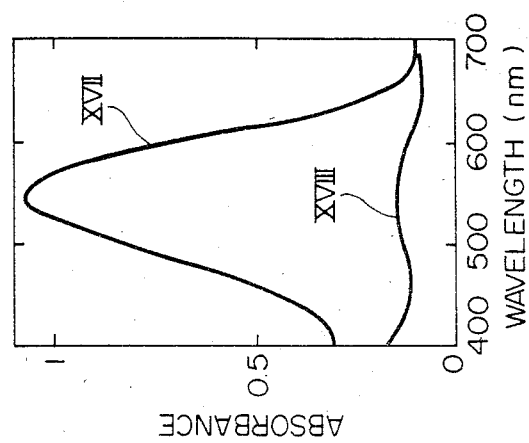
Figure 8:
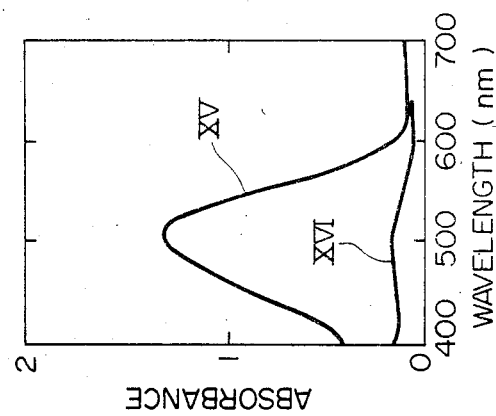
Figure 7:
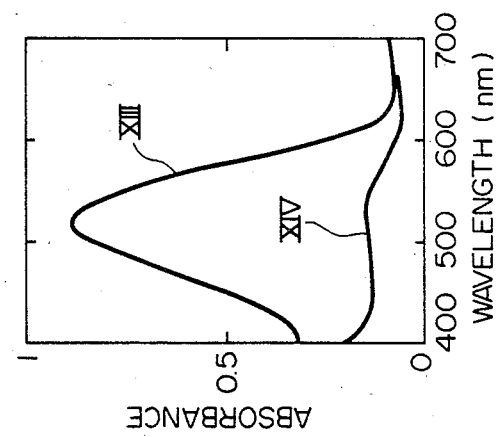

C-10 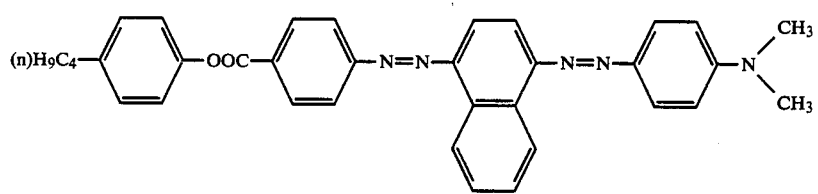 0.79
purple (548 nm)
C-11 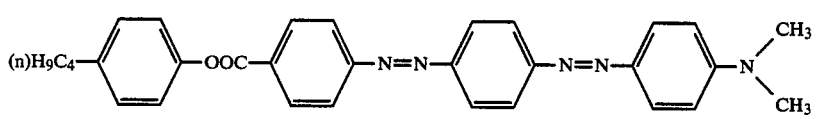 0.76
reddish purple (508 nm)
C-12 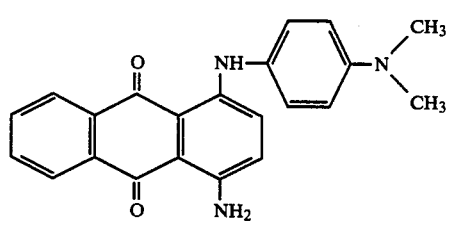 0.59
blue (620 nm)
C-13 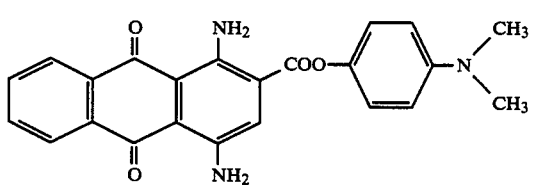 0.75
blue (642 nm)
C-14 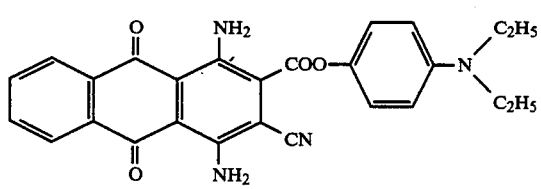 0.74
cyane (667 nm)
C-15 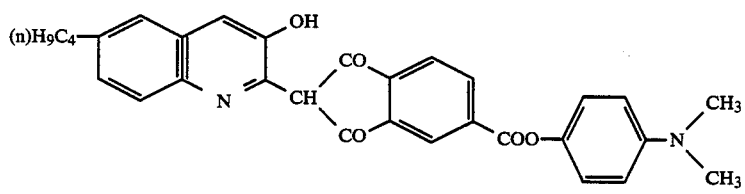 0.69
yellow
C-16 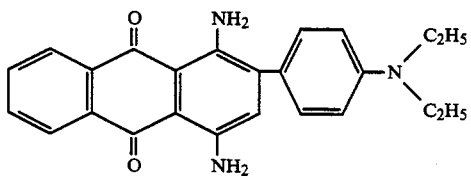 0.73
purple C-17 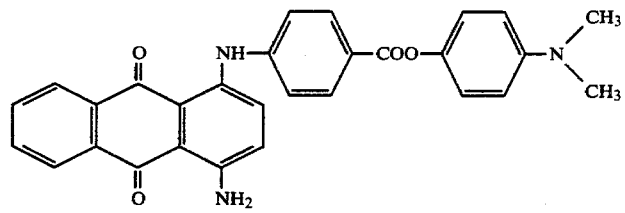 0.70
blue
C-18 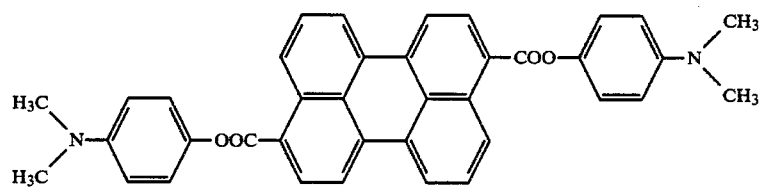 0.70
yellow
C-19 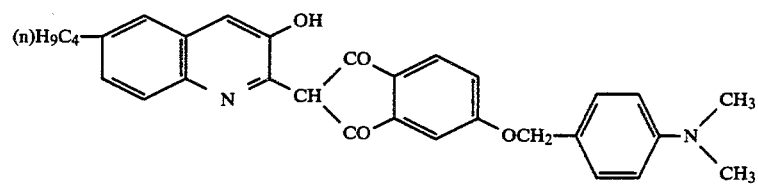 0.69
yellow
C-20 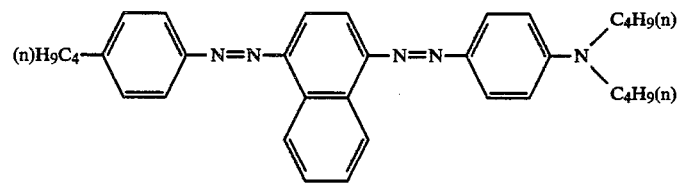 0.66
reddish purple
TABLE 5
| Dye No. | Solubility (% by wt) | Dye No. | Solubility (% by wt) |
|---|---|---|---|
| C-1 | 0.5 | C-10 | 3.4 |
| 176 | >5 | 234 | >5 |
| C-3 | 0.5 | 274 | 5 |
| 172 | >4 | C-11 | 0.9 |
| C-4 | 2.6 | 39 | 3.9 |
| 26 | >5 | 180 | 4.2 |
| 218 | >5 | 181 | 3.7 |
| 222 | >3 | 182 | 4.4 |
| C-5 | 0.3 | 183 | 1.9 |
| 173 | 1.7 | 184 | 2.7 |
| 368 | 1.0 | 185 | 2.5 |
| C-6 | 0.2 | 186 | 4.2 |
| 370 | 1.2 | 187 | 4.0 |
| C-7 | 2.4 | 188 | >5.6 |
| 174 | >5 | 189 | 6.1 |
| 369 | 3.5 | 190 | 2.3 |
| C-8 | 0.2 | 231 | 1.3 |
| 171 | >3 | C-12 | 0.6 |
| 178 | >1 | 130 | 3.2 |
| C-9 | 0.3 | 191 | 3.5 |
| 177 | >3 | 326 | 2.4 |
| 179 | >1.5 | 371 | 2.7 |
| | | 372 | 2.0 |
| C-13 | 0.4 | C-15 | 1.6 |
| 107 | 2.3 | 339 | 3.8 |
| 192 | 2.0 | C-16 | 1.4 |
| 373 | 3.1 | 102 | 3.8 |
TABLE 5-continued
| Dye No. | Solubility (% by wt) | Dye No. | Solubility (% by wt) |
|---|---|---|---|
| 299 | 3.1 | C-17 | 0.7 |
| C-14 | 0.2 | 131 | 2.3 |
| 113 | 1.4 | C-18 | 0.4 |
| 305 | 2.0 | 141 | 2.8 |
| | | C-19 | 0.9 |
| | | 145 | 3.5 |
TABLE 6
| Dye No. | Concentration of Dye (% by weight) | A// | A⊥ | S | Remarks |
|---|---|---|---|---|---|
| 26 | 0.69 | 1.380 | 0.165 | 0.71 | FIG. 1 |
| 39 | 0.76 | 0.930 | 0.075 | 0.79 | FIG. 2 |
| 42 | 0.63 | 0.830 | 0.085 | 0.75 | FIG. 3 |
| 172 | 0.71 | 1.442 | 0.184 | 0.70 | FIG. 4 |
| 173 | 0.68 | 1.078 | 0.112 | 0.74 | |
| 174 | 0.73 | 1.036 | 0.129 | 0.70 | |
| 218 | 0.53 | 0.972 | 0.122 | 0.70 | FIG. 5 |
| 226 | 0.53 | 1.031 | 0.132 | 0.69 | FIG. 6 |
| 228 | 0.52 | 0.816 | 0.095 | 0.72 | FIG. 7 |
| 231 | 0.84 | 1.236 | 0.105 | 0.78 | FIG. 8 |
| 234 | 0.71 | 1.009 | 0.095 | 0.76 | FIG. 9 |
| 367 | 0.70 | 1.432 | 0.132 | 0.77 | |

What we claim is:

1. A liquid crystal composition comprising host liquid crystal composition and guest pleochroic dye dissolved in the composition, wherein the pleochroic dye is at least one member represented by the following general formula:

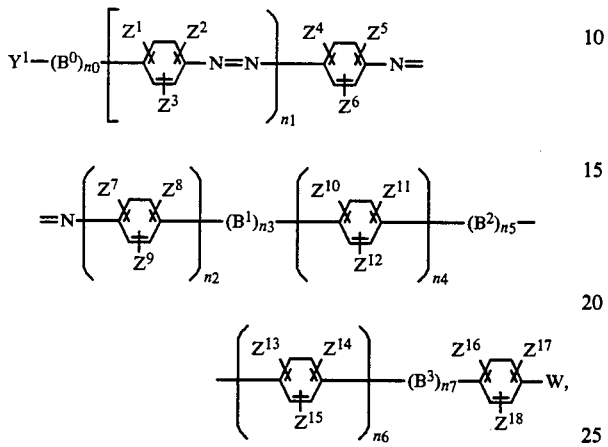

where
W: the group represented by the formula

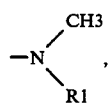

R1 designating a straight chain alkyl group having 2 to 18 carbon atoms or the group

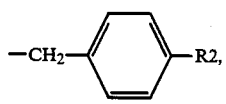

and in R1 a methylene group not adjacent to the nitrogen atom may be substituted by oxygen atom or sulfur atom, and R2 designates a hydrogen atom, an alkyl or alkoxy group having 1 to 7 carbon atoms, or a cyclohexyl group, and $B^0$, $B^1$, $B^2$, $B^3$: —N=N—, —N=CH—, —CH=N—, COO—, —OCO—, —COS—, —SCO—, —OCH$_2$—, —CH$_2$O—, —SCH$_2$—, —CH$_2$S—, —NHCO—, —CONH—, or —CH$_2$CH$_2$—, and $Z^1$ to $Z^{18}$: Hydrogen atom, halogen atom, methyl group, hydroxyl group, methoxy group, or a cyano group; and $Z^1$ and $Z^2$, $Z^4$ and $Z^5$, $Z^7$ and $Z^8$, $Z^{10}$ and $Z^{11}$, $Z^{13}$ and $Z^{14}$, and $Z^{16}$ and $Z^{17}$ may be bonded together to form a naphthalene ring, and $n_0$, $n_3$, $n_5$, $n_7$: zero or 1, and $n_1$, $n_2$, $n_4$, $n_6$: zero, 1 or 2, with the proviso that $n_3$ is 0 when $n_2$ is 0, $n_5$ is 0 when $n_4$ is 0, and $n_7$ is 0 when $n_6$ is 0, and $Y^1$: when $n_0$ is 0, $Y^1$ is a hydrogen atom, a halogen atom, an alkyl or alkoxy group having 1 to 18 carbon atoms, cyclohexyl group, a bicyclooctyl group, a nitro group, an aryl group, or a group shown by the formula

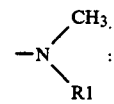

while when $n^0$ is 1, $Y^1$ is a cyclohexyl group, a bicyclooctyl group or an aryl group, whereby said pleochroic dye has a solubility in the host liquid crystal composition which is improved as compared with corresponding pleochroic dyes not containing the end group W of the general formula, without reduction of the order parameter of said pleochroic dye in the host liquid crystal composition.

2. A liquid crystal composition as defined in claim 1, wherein the straight chain alkyl group of R1 has 4 to 12 carbon atoms.

3. A liquid crystal composition as defined in claim 2, wherein R1 is

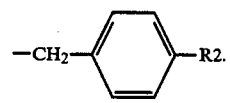

4. A liquid crystal composition as defined in claim 2, wherein said host liquid crystal composition is one which forms a nematic liquid crystal.

5. A liquid crystal composition as defined in claim 2, wherein said host liquid crystal composition includes at least one substance selected from the group consisting of:

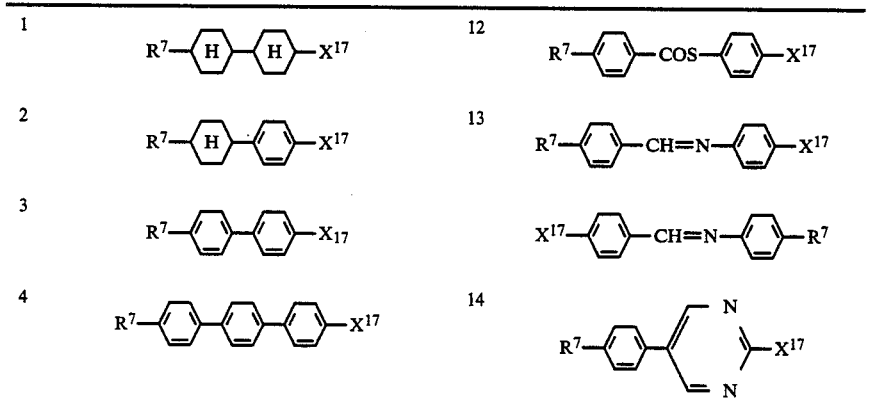

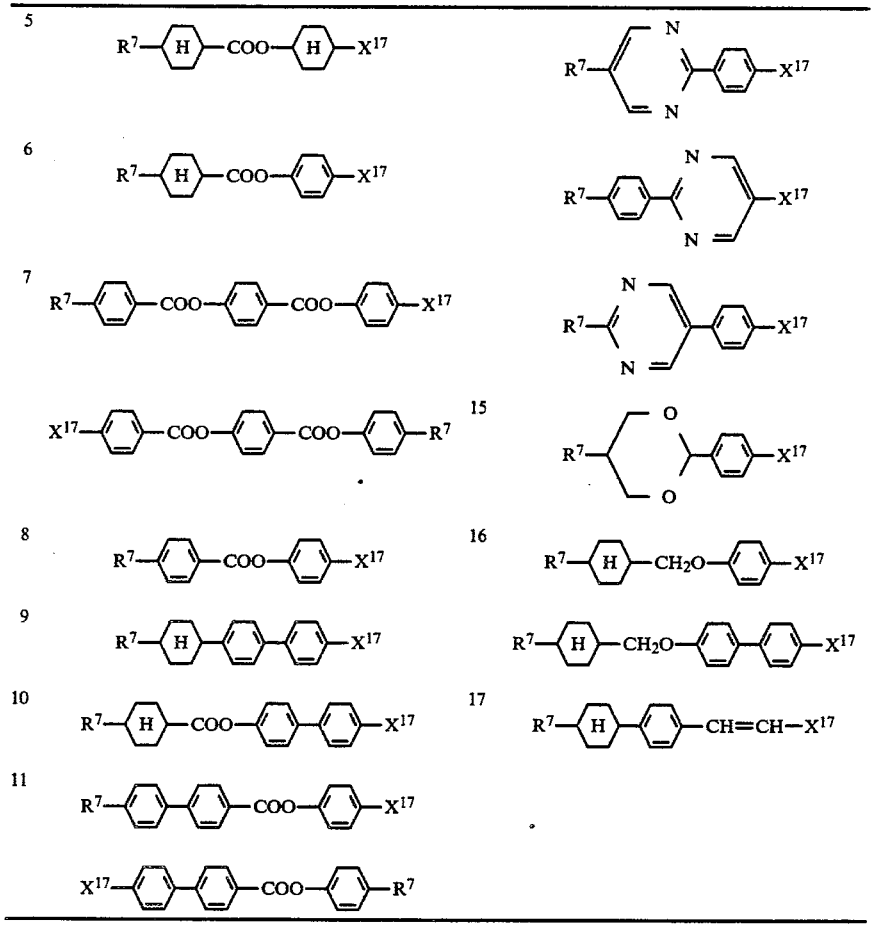

where $R^7$ is an alkyl or alkoxy group and $X^{17}$ is nitro, cyano, or a halogen.

6. A liquid crystal composition according to claim 2, wherein said host liquid crystal composition includes

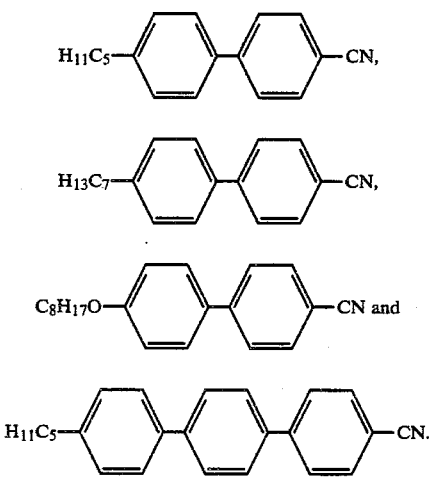

7. A liquid crystal composition according to claim 6, wherein the host liquid crystal composition includes 51% by weight of (1), 25% by weight of (2), 16% by weight of (3) and 8% by weight of (4).

8. A liquid crystal composition according to claim 2, wherein said host liquid crystal composition includes

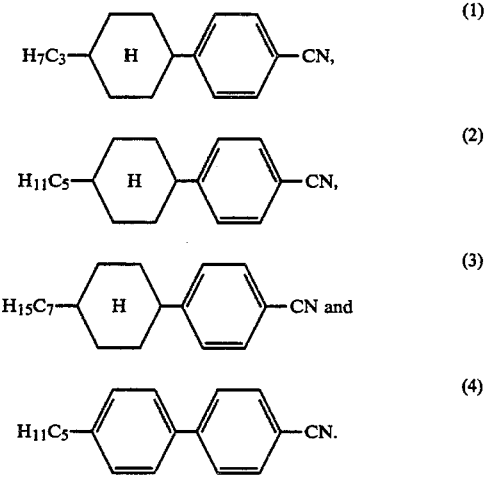

9. A liquid crystal composition according to claim 8, wherein the host liquid crystal composition includes 38.4% by weight of (1), 34.2% by weight of (2), 18.1% by weight of (3) and 9.3% by weight of (4).

10. A liquid crystal composition according to claim 8, wherein in R1 a methylene group not adjacent to the nitrogen can be substituted by oxygen atom.

* * * * *